United States Patent
Park et al.

(10) Patent No.: US 10,628,121 B2
(45) Date of Patent: Apr. 21, 2020

(54) ELECTRONIC DEVICE AND METHOD FOR CONTROLLING THE SAME

(71) Applicant: Samsung Electronics Co., Ltd., Suwon-si, Gyeonggi-do (KR)

(72) Inventors: An-na Park, Suwon-si (KR); Byung-jun Son, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 15/278,414

(22) Filed: Sep. 28, 2016

(65) Prior Publication Data
US 2017/0097807 A1 Apr. 6, 2017

(30) Foreign Application Priority Data
Oct. 1, 2015 (KR) .................. 10-2015-0138431

(51) Int. Cl.
| | | |
|---|---|---|
| *G06F 3/16* | (2006.01) | |
| *G09B 21/00* | (2006.01) | |
| *G10L 13/00* | (2006.01) | |
| *G06F 3/01* | (2006.01) | |
| *G06F 3/0488* | (2013.01) | |
| *G06T 1/00* | (2006.01) | |

(52) U.S. Cl.
CPC .............. *G06F 3/167* (2013.01); *G06F 3/016* (2013.01); *G06F 3/165* (2013.01); *G09B 21/006* (2013.01); *G10L 13/00* (2013.01); *G06F 3/0488* (2013.01); *G06T 1/0007* (2013.01); *G06T 2200/24* (2013.01)

(58) Field of Classification Search
CPC ........ G06F 3/016; G06F 3/0488; G06F 3/167; G06F 3/0165
See application file for complete search history.

(56) References Cited

U.S. PATENT DOCUMENTS

| | | | |
|---|---|---|---|
| 6,774,939 B1 * | 8/2004 | Peng ...................... | G03B 17/24 348/231.2 |
| 7,587,136 B2 * | 9/2009 | Mino ..................... | G03B 17/00 348/231.4 |
| 9,075,520 B2 | 7/2015 | Park et al. | |

(Continued)

FOREIGN PATENT DOCUMENTS

| | | |
|---|---|---|
| JP | 2005-165255 A | 6/2005 |
| JP | 4738203 B2 | 8/2011 |

(Continued)

OTHER PUBLICATIONS

Kim et al., The Music Composition with the Analysis of Image Color Information, The Proceedings of the 2010 (Korean Institute of Information Technology) Summer Conference, pp. 575-577.

*Primary Examiner* — William L Bashore
*Assistant Examiner* — Gregory A Distefano
(74) *Attorney, Agent, or Firm* — Jefferson IP Law, LLP

(57) ABSTRACT

An electronic device and a method for controlling the same are provided. The electronic device includes a image acquirer configured to acquire a image, an audio output configured to play audio contents, and a processor configured to segment the acquired image into a plurality of regions, analyze the plurality of segmented regions, acquire the audio contents corresponding to the plurality of regions based on the analyzed results, and control the audio output to play the acquired audio contents.

2 Claims, 36 Drawing Sheets

(56) References Cited

U.S. PATENT DOCUMENTS

| | | | | |
|---|---|---|---|---|
| 2004/0037540 | A1* | 2/2004 | Frohlich | G11B 31/006 386/285 |
| 2005/0191036 | A1* | 9/2005 | Okutani | H04N 9/8063 386/230 |
| 2007/0104341 | A1 | 5/2007 | Kondo et al. | |
| 2007/0126927 | A1 | 6/2007 | Yun et al. | |
| 2011/0320114 | A1* | 12/2011 | Buxton | G01C 21/3608 701/439 |
| 2012/0124470 | A1 | 5/2012 | West et al. | |
| 2012/0201404 | A1* | 8/2012 | Yamamoto | H04S 7/30 381/306 |
| 2013/0000463 | A1* | 1/2013 | Grover | G06Q 30/04 84/483.2 |
| 2014/0049491 | A1* | 2/2014 | Nagar | G06F 3/016 345/173 |
| 2014/0314391 | A1* | 10/2014 | Kim | G11B 27/11 386/248 |
| 2015/0268806 | A1* | 9/2015 | Shinohara | G06F 3/0483 715/771 |

FOREIGN PATENT DOCUMENTS

| | | |
|---|---|---|
| JP | 5047304 B2 | 10/2012 |
| KR | 10-0581060 B1 | 5/2006 |
| KR | 10-0725357 B1 | 5/2007 |
| KR | 10-1421066 B1 | 7/2014 |
| WO | 2012-170745 A2 | 12/2012 |

* cited by examiner

ELECTRONIC DEVICE AND METHOD FOR CONTROLLING THE SAME

CROSS-REFERENCE TO RELATED APPLICATION(S)

This application claims the benefit under 35 U.S.C. § 119(a) of a Korean patent application filed on Oct. 1, 2015 in the Korean Intellectual Property Office and assigned Serial number 10-2015-0138431, the entire disclosure of which is hereby incorporated by reference.

TECHNICAL FIELD

The present disclosure relates to an electronic device and a method for controlling the same. More particularly, the present disclosure relates to an electronic device capable of analyzing a image and outputting an audio for the image, and a method for controlling the same.

BACKGROUND

In recent years, various image contents may be provided through various sources. In particular, a user may receive image contents through portable terminals, such as a smart phone, independent of time and place.

However, individuals who suffer from blindness may only confirm or use information based on simple text type contents, like braille or audio type contents, but may not confirm image contents. Therefore, although lots of image contents may be provided, individuals who suffer from blindness have trouble confirming information based on the image contents.

Therefore, a method for allowing individuals who suffer from blindness to confirm intuitive information on image contents is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device capable of providing information or atmosphere on image contents to a user by providing audio contents corresponding to the image contents and a method for controlling the same.

Another aspect of the present disclosure is to provide an electronic device capable of providing more intuitive region guide information to a user by analyzing image contents and a method for controlling the same.

In accordance with an aspect of the present disclosure, an electronic device is provided. The electronic device includes a image acquirer configured to acquire a image, an audio output configured to play audio contents, and a processor configured to segment the acquired image into a plurality of regions, analyze the plurality of segmented regions, acquire the audio contents corresponding to the plurality of regions based on the analyzed results, and control the audio output to play the acquired audio contents.

The electronic device may further include a storage configured to map and store image categories and the audio contents, in which the processor may determine categories of each of the plurality of segmented regions, and retrieve the audio contents mapped to the determined categories to acquire the audio contents corresponding to the plurality of regions.

The electronic device may further include a storage configured to map and store image parameters and composition parameters, in which the processor may analyze image parameters for each of the plurality of segmented regions, and create the audio contents using the composition parameters mapped to the analyzed image parameters.

The electronic device may further include a storage configured to map and store image categories and composition parameters, in which the processor may determine categories of the plurality of segmented regions, and create the audio contents using the composition parameters mapped to the determined categories.

The processor may determine image areas of each of the plurality of regions and determine at least one of a playing time and a playing order of the audio contents corresponding to each of the plurality of regions depending on the image areas of each of the plurality of acquired regions.

The processor may divide the plurality of regions included in the image into a main region and a sub region, create main audio contents using the main region, and create sub audio contents using the sub region.

The electronic device may further include an input unit configured to receive a user instruction touching a first region in the acquired image, in which the processor may analyze a image of the first region to which the user instruction is input, and acquire the audio contents corresponding to the first region based on the analyzed results.

The electronic device may further include a haptic provider configured to provide a haptic feedback, in which, if the user instruction touching the first region is input, the processor may control the haptic provider to provide the haptic feedback to the first region.

The processor may determine a motion of an object included in a first region among the plurality of regions, and create the audio contents including information corresponding to the motion of the object included in the first region.

In accordance with another aspect of the present disclosure, a method for controlling an electronic device is provided. The method includes acquiring a image, segmenting the acquired image into a plurality of regions, analyzing the plurality of segmented regions, acquiring audio contents corresponding to the plurality of regions based on the analyzed results, and playing the acquired audio contents.

The method may further include mapping and storing image categories and the audio contents, in which the analyzing may include determining categories of each of the plurality of segmented regions, and, in the acquiring of the audio contents, the audio contents mapped to the determined categories may be retrieved to acquire the audio contents corresponding to the plurality of regions.

The method may further include mapping and storing image parameters and composition parameters, in which the analyzing may include analyzing the image parameters for each of the plurality of segmented regions and, in the acquiring of the audio contents, the audio contents may be created using the composition parameters mapped to the analyzed image parameters.

The method may further include mapping and storing image categories and composition parameters, in which the analyzing may include determining categories of each of the plurality of segmented regions, and, in the acquiring of the audio contents, the audio contents may be created using the composition parameters mapped to the determined categories.

The analyzing may include determining image areas of each of the plurality of regions, and, in the acquiring of the audio contents, at least one of a playing time and a playing order of the audio contents corresponding to each of the plurality of regions may be determined depending on the image areas of each of the plurality of acquired regions.

The analyzing may include dividing the plurality of regions included in the image into a main region and a sub region, and, in the acquiring of the audio contents, main audio contents may be created using the main region and sub audio contents may be created using the sub region.

The method may further include receiving a user instruction touching a first region in the acquired image, in which in the analyzing, the image of the first region may be analyzed, and, in the acquiring of the audio contents, the audio contents corresponding to the first region may be acquired based on the analyzed results.

The method may further include, if the user instruction touching the first region is input, providing a haptic feedback to the first region.

The analyzing may include determining a motion of an object included in a first region among the plurality of regions, and, in the acquiring of the audio contents, the audio contents including information corresponding to the motion of the object included in the first region may be created.

In accordance with another aspect of the present disclosure, an electronic device is provided. The electronic device includes a communicator configured to communicate with an external device, and a processor configured to segment a image received through the communicator into a plurality of regions, analyze the plurality of segmented regions to generate region guide information corresponding to the plurality of regions, and control the communicator to transmit the acquired region guide information to the external device.

The processor may receive a key frame of a image from the external device and may analyze and segment the received key frame into the plurality of regions.

The processor may recognize a text included in the received image using an optical character recognition (OCR), or analyze a category corresponding to the image.

When the region guide information comprises information in an audio form, the processor may insert at least one of a copy frame and an interpolation frame into the image when a playing length of the region guide information is longer than that of the image.

The electronic device may further include an input unit configured to receive a user instruction touching a first region in the image, in which the processor may analyze the first region to which the user instruction is input and generate region guide information corresponding to the first region based on the analyzed results.

The processor may control the communicator to transmit a position of the corresponding region along with the acquired region guide information.

In accordance with another aspect of the present disclosure, a method for controlling an electronic device is provided. The method includes receiving a image from an external device, segmenting the received image into a plurality of regions, analyzing the plurality of segmented regions, generating region guide information corresponding to the plurality of regions based on the analyzed results, and transmitting the region guide information to the external device.

The method may further include extracting a key frame of the received image, in which, in the analyzing, the extracted key frame may be segmented into the plurality of regions to be analyzed.

In the analyzing, a text included in the image may be recognized using an OCR or a category corresponding to the image may be analyzed.

When the region guide information comprises information in an audio form, at least one of a copy frame and an interpolation frame may be inserted into the image when a playing length of the region guide information is longer than that of the image.

The method may further include receiving a user instruction touching a first region in the image, in which, in the analyzing, the first region to which the user instruction is input may be analyzed.

In the transmitting, a position of the corresponding region may be transmitted along with the generated region guide information.

As described above, according to various embodiments of the present disclosure, the user may more easily and intuitively confirm the information or atmosphere on the image content.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
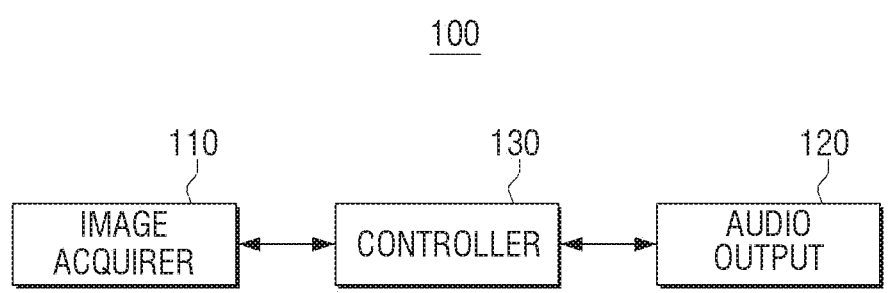
FIG. 1 is a block diagram schematically illustrating a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms 'first', 'second', and the like, may be used to describe various components, but the components are not to be construed as being limited by the terms. The terms are used only to distinguish one component from another component.

It will be further understood that the terms "comprises" or "have" used in this specification, specify the presence of stated features, operations, components, parts mentioned in this specification, or a combination thereof, but do not preclude the presence or addition of one or more other features, numerals, operations, components, parts, or a combination thereof.

In various embodiments of the present disclosure, a 'module' or a 'unit' performs at least one function or operation and may be implemented by hardware or software or a combination of the hardware and the software. Further, a plurality of 'modules' or a plurality of 'units' are integrated into at least one module except for the 'module' or 'unit' which needs to be implemented by specific hardware and thus may be implemented by at least one processor.

In various embodiments of the present disclosure, a case in which any one part is "connected" with the other part includes a case in which the parts are "directly connected" with each other and a case in which the parts are "electrically connected" with each other with other elements interposed therebetween. In addition, unless explicitly described to the contrary, "comprising" any components will be understood to imply the inclusion of other elements rather than the exclusion of any other elements.

Hereinafter, various embodiments of the present disclosure will be described in detail with reference to the accompanying drawings so that those skilled in the art may easily practice the present disclosure. However, the present disclosure may be modified in various different ways and is not limited to various embodiments of the present disclosure provided in the present description. In the accompanying drawings, portions unrelated to the description will be omitted in order to clearly describe the present disclosure, and similar reference numerals will be used to describe similar portions throughout the present specification.

FIG. 1 is a block diagram schematically illustrating a configuration of an electronic device 100 according to an embodiment of the present disclosure.

Referring to FIG. 1, the electronic device 100 includes a image acquirer 110, an audio output 120, and a controller 130. Meanwhile, according to an embodiment of the present disclosure, the electronic device 100 may be implemented as a smart phone, which is only an example. Therefore, the electronic device 100 may be implemented as various electronic devices such as a tablet personal computer (PC), a notebook PC, a smart television (TV), and a camera.

The image acquirer 110 acquires image data from various sources. In detail, the image acquirer 110 may photograph images using a camera to acquire image data and receive the image data from various external devices to acquire the image data. According to an embodiment of the present disclosure, image data acquired by the image acquirer 110 may be moving image data or static image data.

The audio output 120 outputs audio data. In particular, the audio output 120 may output audio corresponding to the image data acquired by the image acquirer 110.

The controller 130 controls an overall operation of the electronic device 100. According to an embodiment of the present disclosure, the controller 130 may segment the image acquired by the image acquirer 110 into a plurality of regions, analyze the plurality of segmented regions, acquire audio contents corresponding to the plurality of regions based on the analyzed results, and control the audio output 120 to play the acquired audio contents.

In detail, the controller 130 may segment the image acquired by the image acquirer 110 into the plurality of regions. In this case, the controller 130 may analyze pixel values of the acquired image to segment the acquired image into the plurality of regions.

Further, the controller 130 may analyze the plurality of regions. In detail, the controller 130 may analyze an object or a background included in the plurality of regions based on the pixel analysis on the plurality of regions. In this case, the controller 130 itself may analyze the image data, which is only an example. Therefore, the controller 130 may control a communicator to transmit the acquired image data to an external server, thereby receiving the analyzed results on the image data.

Further, the controller 130 acquires the audio contents corresponding to the plurality of regions based on the analyzed results. According to an embodiment of the present disclosure, the controller 130 may determine categories of each of the plurality of segmented regions and may retrieve the audio contents mapped to the determined categories to acquire the audio contents corresponding to the plurality of regions. That is, the controller 130 may not directly create music contents using image parameters, but may use the already created audio contents to create the audio contents.

According to an embodiment of the present disclosure, the controller 130 may analyze the image parameters for each of the plurality of segmented regions and create the audio contents using composition parameters previously mapped to the analyzed image parameters. In detail, the controller 130 may determine a step, a rhythm, an atmosphere, a musical representation, etc. of the audio contents using various image parameters (for example, color, image size, object type, etc.). Further, the controller 130 may determine categories (for example, mountain, sea, town, etc.) of the plurality of segmented regions and may use composition parameters mapped to the determined categories to create the audio contents. That is, the controller 130 may directly create music contents using various image parameters.

Further, the controller 130 may determine image areas of each of the plurality of regions and determine at least one of a playing time and a playing order of the audio contents corresponding to each of the plurality of regions using the image areas of each of the plurality of acquired regions. For example, the controller 130 may set the playing time of the corresponding audio contents to be long in proportion to the increase in the region area, or set the playing order of the corresponding audio contents as a preceding playing order.

Further, the controller 130 may divide the plurality of regions included in the image into a main region and a sub region, create main audio contents using the main region, and create sub audio contents using the sub region. In this case, the main audio contents may be the audio contents having a long playing time, which is only an example. Therefore, the main audio contents may be an audio contents of a melody line. Further, the sub audio contents may be audio contents having a shorter playing time than the main audio contents, which is only an example. Therefore, the sub audio contents may be audio contents of an accompaniment.

Further, when a user instruction touching a first region among the acquired images is input, the controller 130 may analyze a image of the first region to which the user instruction is input and acquire audio contents corresponding to the first region based on the analyzed results. For example, the controller 130 may analyze parameter or categories of the region to which the user instruction is input to create the audio contents corresponding to the region to which the user instruction is input. In this case, if the user instruction touching the first region is input, the controller 130 may provide a haptic feedback to the first region.

Further, the controller 130 may determine a motion of an object included in the first region among the plurality of regions and create audio contents including information corresponding to the motion of the object included in the first region. For example, if it is determined that a vehicle moves in the first region among the plurality of regions, the controller 130 may create audio contents including a horn representing that the vehicle moves.

As described above, according to various embodiments of the present disclosure, a user may more easily and intuitively confirm atmosphere, information, etc., associated with a current image in an auditory form.

Hereinafter, the present disclosure will be described in more detail with reference to FIGS. 2 to 8B.

Figure 2:
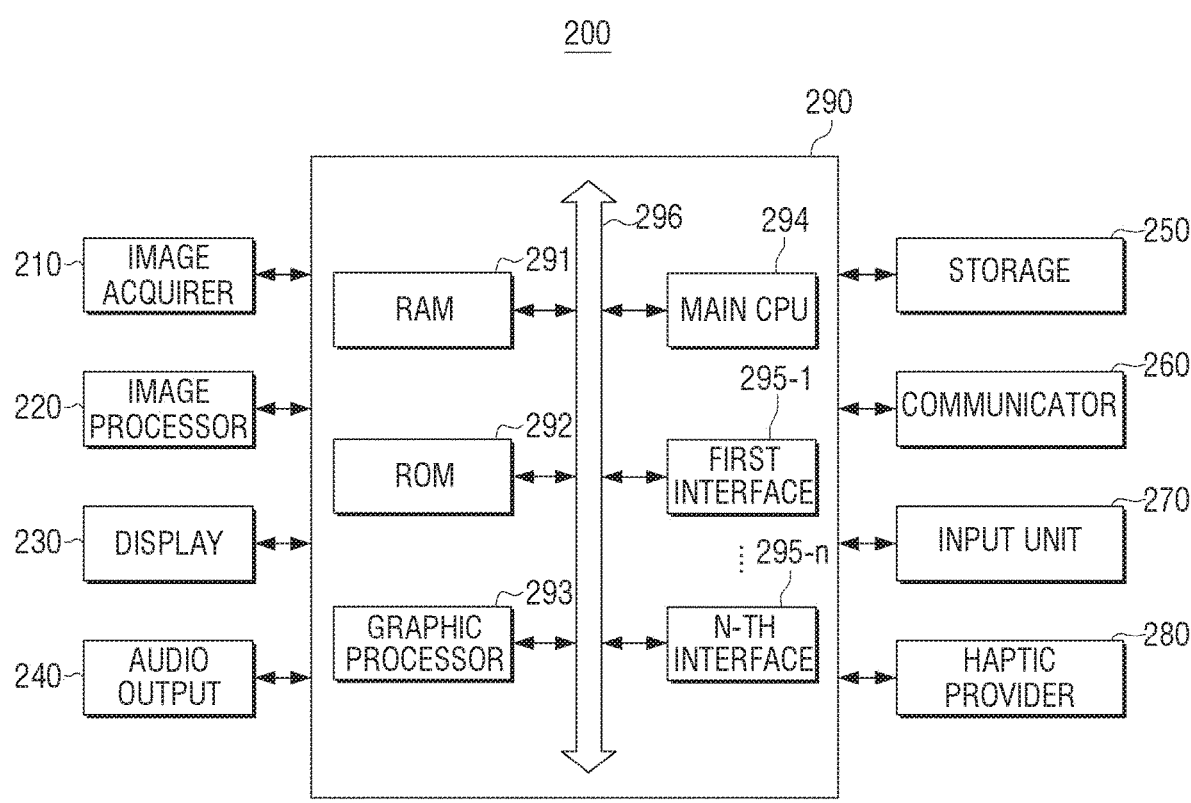
FIG. 2 is a block diagram illustrating in detail the configuration of the electronic device according to an embodiment of the present disclosure.

FIG. 2 is a block diagram illustrating a configuration of an electronic device 200 according to an embodiment of the present disclosure.

Referring to FIG. 2, the electronic device 200 may include a image acquirer 210, a image processor 220, a display 230, an audio output 240, a storage 250, a communicator 260, an input unit 270, a haptic provider 280, and a controller (or processor) 290. Meanwhile, the configuration of the electronic device 200 illustrated in FIG. 2 is only an example, which is not necessarily limited to the foregoing block diagram. Therefore, some of the components of the electronic device 200 illustrated in FIG. 2 may be omitted, changed, or added according to a kind of the electronic device 200 or a purpose of the electronic device 200.

The image acquirer 210 acquires images from various sources. In detail, the image acquirer 210 may photograph images using a camera to acquire the images. Further, the image acquirer 210 may receive the image data from various external sources (for example, external server, image player, imaging equipment, etc.) to acquire a image. Further, the image acquirer 210 may read pre-stored image data according to the user instruction to acquire a image.

The image processor 220 comprises a component for performing image processing on image data acquired from the image acquirer 210. The image processor 220 may perform various image processing, such as decoding, scaling, noise filtering, frame rate conversion, and resolution conversion, on the image data.

The display 230 displays the image contents received from the image acquirer 210 and at least one of various user interfaces (UIs) processed by a graphic processor 293. In this case, the display 230 may have various sizes. For example, the display 230 may have a size of 3 inches, 4 inches, 4.65 inches, 5 inches, 6.5 inches, 8.4 inches, etc. The display 230 may comprise a plurality of pixels. In this case, the number of horizontal pixels×the number of vertical pixels may be represented as resolution. For example, the display 230 may have 320×320 resolutions, 360×480 resolutions, 720×1280 resolutions, 1280×800 resolutions, 3940×2160 resolutions, or the like.

Further, the display 230 may be implemented as various forms of a display panel. For example, the display panel may be implemented by various display technologies such as a liquid crystal display (LCD), an organic light emitting diode (OLED), an active-matrix OLED (AM-OLED), a liquid crystal on silicon (LcoS), and digital light processing (DLP).

The display 230 may be coupled with at least one of a front region, a side region, and a back region of the electronic device 200 in a flexible display form. The flexible display may be warped, bent, or rolled without any damage due to a thin and flexible substrate similar to paper. The flexible display may also be manufactured using a generally used glass substrate and a plastic substrate. In the case of using the plastic substrate, to prevent the substrate from being damaged, the flexible display may be manufactured using a low-temperature manufacturing process without using the existing manufacturing process. Further, by replacing the glass substrate enclosing a flexible liquid crystal with a plastic film, the flexible display may have foldable and non-foldable flexibility. The flexible display may be thin, light, and strong against impact, may be warped or bent, and may be manufactured in various forms.

The display 230 may be coupled with a touch input and thus may be implemented as a touch screen having a layer structure. The touch screen may have a display function and a function of detecting a touch input position, a touched area, and a touch input pressure and may have a function of detecting a real-touch and a proximity touch.

The audio output 240 may be configured to output various alarm sounds or voice messages in addition to various audio data on which various processing operations such as decoding, amplification, and noise filtering are performed by an audio processor. In particular, the audio output 240 may be implemented as a speaker, which is only an example. Therefore, the audio output 240 may be implemented as an output terminal through which audio data may be output.

The storage 250 may store various programs and data required to operate the electronic device 200. The storage 250 may be implemented as a non-volatile memory, a volatile memory, a flash memory, a hard disk drive (HDD), a solid state drive (SSD), etc. The storage 250 may be accessed by a controller 290 and reading/recording/modification/deletion/update, etc., of data may be performed by the controller 290. According to the present disclosure, the storage 250 may include a read-only memory (ROM) 292 and a random access memory (RAM) 291 within the controller 290 or a memory card (not illustrated) (for example, micro secure digital (SD) card, memory stick) equipped in the electronic device 200. Further, the storage 250 may store programs, data, etc., for configuring various screens to be displayed in a display region of the display 230.

Hereinafter, a structure of software stored in the storage 250 will be described with reference to FIG. 3.

Figure 3:
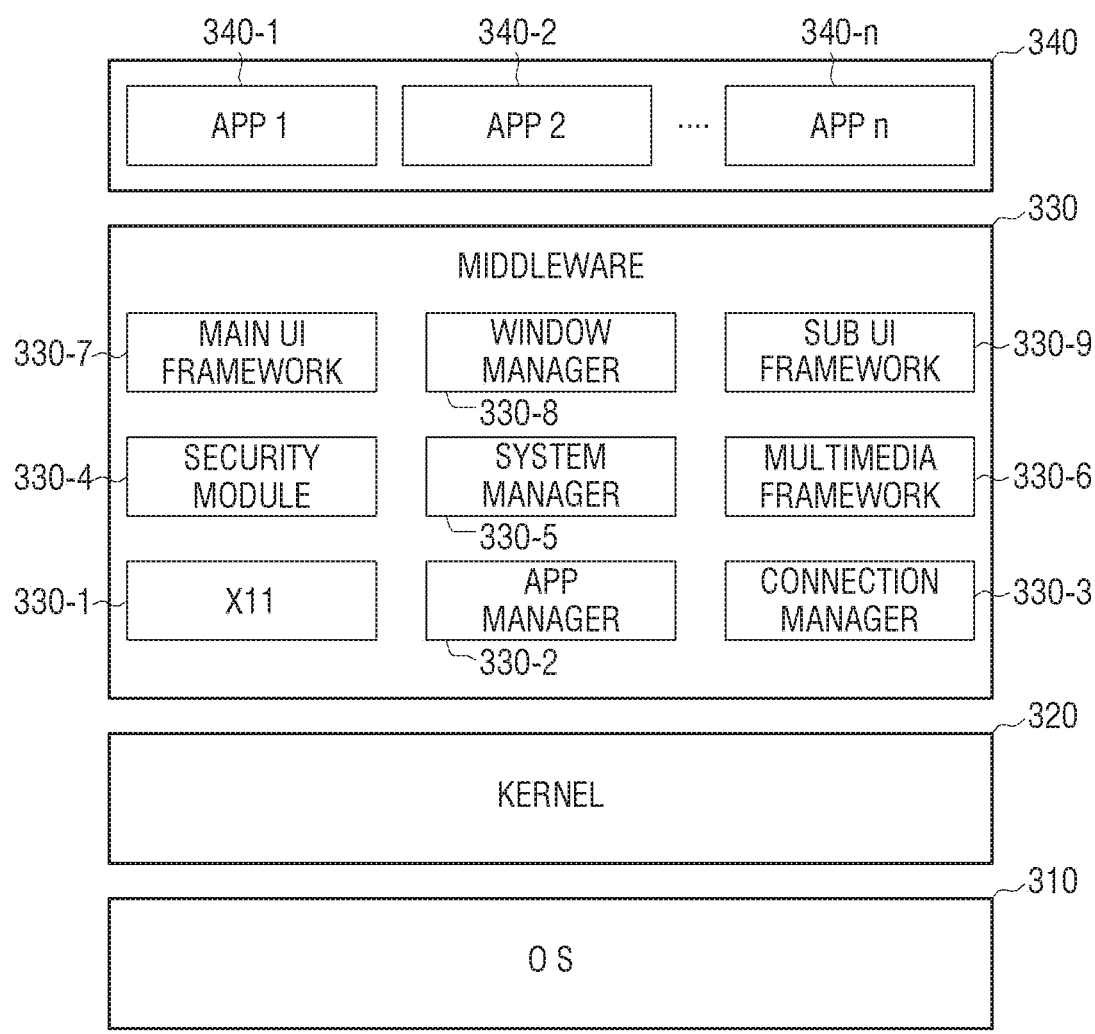
FIG. 3 is a block diagram illustrating in detail a configuration of a storage according to an embodiment of the present disclosure.

FIG. 3 is a block diagram illustrating in detail a configuration of a storage according to an embodiment of the present disclosure.

Referring to FIG. 3, the storage 250 may store software such as an operating system (05) 310, a kernel 320, a middleware 330, and an application module 340.

The OS 310 serves to control and manage the overall operations of hardware. That is, the OS 310 is a hierarchy taking charge of basic functions of hardware management, memory, security, etc.

The kernel 320 serves as a path through which various signals in addition to a touch signal, etc., sensed by a sensor are transferred to the middleware 330.

The middleware 330 includes various software modules for controlling the operation of the electronic device 200. Referring to FIG. 3, the middleware 330 includes an X11 module 330-1, an application (APP) manager 330-2, a connection manager 330-3, a security module 330-4, a system manager 330-5, a multimedia framework 330-6, a main UI framework 330-7, a window manager 330-8, and a sub UI framework 330-9.

The X11 module 330-1 comprises a module for receiving various event signals from various hardware included in the display. Here, the event may be variously set like an event that a user gesture is sensed, an event that a system alarm is generated, or an event that a specific program is executed or ended, etc.

The APP manager 330-2 comprises a module for managing an execution state of various applications of the application module 340 installed in the storage 250. The APP manager 330-2 calls and executes an application corresponding to the corresponding event when the X11 module 330-1 senses an application execution event.

The connection manager 330-3 comprises a module for supporting a wired or wireless network connection. The connection manager 330-3 may include various detailed modules such as a distributed net (DNET) module and a universal plug n play (UPnP) module.

The security module 330-4 comprises a module for supporting certification, permission, secure storage for hardware, etc.

The system manager 330-5 monitors a state of each component within the electronic device 200 and provides the monitored results to other modules. For example, when a residual quantity of a battery is insufficient, an error occurs, or a communication connection state is broken, etc., and the system manager 330-5 may provide the monitored results to the main UI framework 330-7 or the sub UI framework 330-9 to output a notification message or a notification sound.

The multimedia framework 330-6 comprises a module for playing multimedia contents which are stored in the electronic device 200 or provided from external sources. The multimedia framework 330-6 may include a player module, a camcorder module, a sound processing module, and the like. Therefore, the multimedia framework 330-6 may perform an operation of playing various multimedia contents to generate and play a screen and a sound.

The main UI framework 330-7 comprises a module for providing various UIs to be displayed in the main region of the display 230 and the sub UI framework 330-9 comprises a module for providing various UIs to be displayed in the sub region. The main UI framework 330-7 and the sub UI framework 330-9 may include a image compositor module configuring various UI elements, a coordinate compositor calculating coordinates at which an UI element is displayed, a rendering module rendering the configured UI element at the calculated coordinates, a two-dimensional (2D)/three-dimensional (3D) UI toolkit providing a tool for configuring a 2D or 3D type of UI, etc.

The window manager 330-8 may sense a touch event using a user's body or a pen or other input events. When the events are sensed, the window manager 330-8 transfers the event signal to the main UI framework 330-7 or the sub UI framework 330-9 to perform an operation corresponding to the sensed event.

In addition, when the user touches and drags an object across the screen, various program modules such as a handwriting module for drawing a line depending on a drag trajectory, an angle calculation module for calculating a pitch angle, a roll angle, a yaw angle, etc., based on sensor values sensed by a motion sensor may also be stored in the electronic device 200.

The application module 340 includes applications 340-1, 340-2, to 340-$n$ for supporting various functions. For example, the application module 340 may include program modules for providing various services such as a navigation program module, a game module, an e-book module, a calendar module, an alarm management module, and a music playing module. The applications may be installed as a default and may be arbitrarily installed and used by a user. If the UI element is selected, a main central processing unit (CPU) 294 may execute an application corresponding to the selected UI element using the application module 340.

The software structure illustrated in FIG. 3 is only an example, and therefore is not necessarily limited thereto. Therefore, some of the components of the electronic device 200 may be omitted, changed, or added according to a kind of the electronic device 200 or a purpose of the electronic device 200. For example, the storage 250 may additionally store various programs such as a sensing module for analyzing signals sensed by various sensors, a messaging module of a messenger program, a text message program, and an e-mail program, etc., a call info aggregator program module, a voice over Internet protocol (VoIP) module, and a web browser module.

Further, the storage 250 may further include a image analysis module for analyzing a image, a composition module for composing music corresponding to a image, a music retrieval module for retrieving music corresponding to a image, etc.

Further, the storage 250 may map and store the image categories and the composition parameters or map and store the image parameters and the composition parameters. Further, the storage 250 may map and store the audio contents corresponding to the image categories.

Referring back to FIG. 2, the communicator 260 may be configured to communicate with various types of external devices according to various communication types. The communicator 260 may include at least one of a Wi-Fi chip, a Bluetooth chip, a wireless communication chip, and a near field communication (NEC) chip. The controller 290 may communicate with an external server or various external devices through the communicator 260.

In particular, the Wi-Fi chip and the Bluetooth chip each may perform communication based on a Wi-Fi scheme and a Bluetooth scheme. In the case of using the Wi-Fi chip or the Bluetooth chip, various connection information such as a service set identifier (SSID) and a session key are first transmitted and received, and a communication connection is made using the connection information and then various information may be transmitted and received. The wireless communication chip means a chip performing communication according to various communication protocols such as Institute of Electrical and Electronics Engineers ZigBee, 3rd generation, 3rd generation partnership project (3GPP), and long term evolution (LTE). The NFC chip means a chip operated by a NFC scheme using a band of 13.56 MHz among various radio frequency ID (RF-ID) frequency bands such as 135 kHz, 13.56 MHz, 433 MHz, 860 to 960 MHz, and 2.45 GHz.

In particular, the communicator 260 may communicate with the external server to analyze a image and communicate with the external server to compose music. Further, the communicator 260 may communicate the external devices to transmit and receive various audio contents and image contents. Further, the communicator 260 may transmit and receive a image to and from the external devices to tag a description of the image.

The input unit 270 receives various user instructions. Further, the input unit 270 may detect at least one of various changes such as a posture change, an illuminance change, and an acceleration change of the electronic device 200 and transfer electrical signals corresponding thereto to the controller 290. That is, the input unit 270 may sense a state change of the electronic device 200, generate a sensing signal in response to the state change, and transfer the generated sensing signal to the controller 290.

According to an embodiment of the present disclosure, the input unit 270 may be configured of various sensors and when the electronic device 200 is driven (or user setting basis), at least one sensor set according to a control of the input unit 270 may be supplied with power to sense the state change of the electronic device 200. In this case, the input unit 270 may be configured of various sensors and may be configured to include at least one of all types of sensing devices which may detect the state change of the electronic device 200. For example, the input unit 270 may be configured to include at least one sensor of various sensing devices such as a touch sensor, an acceleration sensor, a gyro sensor, an illuminance sensor, a proximity sensor, a pressure sensor, a noise sensor (for example, a microphone), a image sensor (for example, a camera module), a pen sensing sensor, and a timer.

In particular, the touch input may sense a user's finger input and may output a touch event value corresponding to the sensed touch signal. The touch panel of the touch input may be mounted under the display 230. As a type to allow the touch input to sense the user's finger input, there may be, for example, a capacitive type and a resistive type. The capacitive type senses micro electricity generated by a user's body to calculate touch coordinates. The resistive type includes two electrode plates embedded in the touch panel and calculates touch coordinates by sensing a flow of current due to a contact between upper and lower plates at a touched point.

The touch input may acquire an output signal depending on a user input from the touch sensor. The touch input may calculate user input information, such as a touch position, a touch coordinate, a touch number, touch strength, a cell ID, a touch angle, and a touch area, from signal values and determine a kind of touch input based on the calculated user input information. In this case, the touch input may determine a kind of touch input based on a touch recognition algorithm, touch pattern data, etc., which are stored in the memory (not illustrated) of the touch panel. When the kind of touch input is determined, the touch input may transmit information on the kind of touch input to the controller 290. The touch input may sense the proximity touch position (or hovering position) input by the user as described above.

In this case, the controller 290 may replace some of the functions of the touch input. For example, the touch input may transmit the signal value acquired from the touch sensor or the user input information calculated based on the signal value to the controller 290. The controller 290 may determine the kind of touch input based on the touch recognition algorithm, the touch pattern data, etc., which are stored in the storage 250 to which the received signal value or the user input information are transmitted.

In addition, the input unit 270 may further include a pen input (for example, pen recognition panel) (not illustrated). The pen input may sense a pen input of a user depending on an operation of a user's touch pen (for example, stylus pen and digitizer pen) and output a pen proximity event value or a pen touch event value. The pen sensor may be implemented as, for example, an electromagnetic resonance (EMR) scheme and may sense a touch or a proximity input depending on a change in strength of electric field due to the proximity or touch of the pen. In detail, the pen recognition panel may be configured to include an electromagnetic induction coil sensor having a grid structure and an electronic signal processor sequentially providing an alternating signal having a predetermined frequency to each loop coil of the electromagnetic induction coil sensor. If a pen having a resonance circuit embedded therein is present around the loop coil of the pen recognition panel, a magnetic field transmitted from the corresponding loop coil generates a current based on mutual electromagnetic induction to the resonance circuit in the pen. Based on the current, the induction magnetic field is generated from the coil configuring the resonance circuit within the pen and the pen recognition panel may detect the induction magnetic field from the loop coil in the signal receiving state to sense an approach position or a touched position of the pen.

The microphone (not illustrated) may receive a user voice (for example, photographing start, photographing stop, photographing end, or the like) for controlling a medical instrument using the electronic device 200.

The haptic provider 280 provides the haptic feedback. In particular, when the user touches one region of the display 230, the haptic provider 280 may provide the haptic feedback to one region which the user touches.

The controller (or processor) 290 may control the overall operation of the electronic device 200 by using various programs stored in the storage 250.

The controller 290 may be configured to include the RAM 291, the ROM 292, the graphic processor 293, the main CPU 294, first to n-th interfaces 295-1 to 295-n, and a bus 296. In this case, the RAM 291, the ROM 292, the graphic processor 293, the main CPU 294, the first to n-th interfaces 295-1 to 295-n, and the like may be connected to each other via the bus 296.

The RAM 291 stores an operating system (O/S) and application programs. In detail, if the electronic device 200 is booted, the O/S may be stored in the RAM 291 and various application data selected by the user may be stored in the RAM 291.

The ROM 292 stores a set of instructions for system booting. If a turn on instruction is input and thus power is supplied, the main CPU 294 copies the O/S stored in the storage 250 to the RAM 291 and executes the O/S, according to the instructions stored in the ROM 292, thereby booting the system. If the booting is completed, the main CPU 294 copies various application programs stored in the storage 250 to the RAM 291 and executes the application programs copied to the RAM 291, thereby performing various operations.

The graphic processor 293 uses an operator (not illustrated) and a renderer (not illustrated) to create a screen including various objects such as an item, an image, and a text. Here, the operator may be a component for operating attribute values, such as coordinate values, forms, sizes, and colors by which each object is displayed, according to a layout of the screen, based on the control instruction received from a sensor. Further, the renderer may be a component for generating a screen of various layouts including an object based on the attribute values calculated by the operator. The screen created by the renderer may be displayed in a display region of the display 230.

The main CPU 294 accesses the storage 250 to perform booting using the O/S stored in the storage 250. Further, the main CPU 294 performs various operations using various programs, contents, data, and the like which are stored in the storage 250.

The first to n-th interfaces 295-1 to 295-*n* are connected to the foregoing various components. One of the first to n-th interfaces 295-1 to 295-*n* may also be a network interface which is connected to the external device through a network.

In particular, the controller 290 may segment the image acquired by the image acquirer 210 into a plurality of regions, analyze the plurality of segmented regions, acquire the audio contents corresponding to the plurality of regions based on the analyzed results, and control the audio output 240 to play the acquired audio contents.

In detail, the controller 290 controls the display 230 to display the image acquired by the image acquirer 210.

Further, if the user instruction for composing audio contents corresponding to a image which is being displayed during the display of the image is input, the controller 290 may segment the currently displayed image into the plurality of regions. In this case, the controller 290 may segment one image frame into a plurality of regions based on a pixel analysis of the image. In detail, the controller 290 may segment a image frame into the plurality of regions using a type of object included in a image, a change in pixel, etc.

Further, the controller 290 may analyze the plurality of regions to acquire the audio contents corresponding to the plurality of regions.

According to an embodiment of the present disclosure, the controller 290 may determine categories of each of the plurality of segmented regions and may retrieve the audio contents mapped to the determined categories to acquire the audio contents corresponding to the plurality of regions. In this case, the controller 290 may acquire the audio contents stored in the storage 250, which is only an example. Therefore, the controller 290 may acquire the audio contents from the external server.

FIGS. 4A to 8B are diagrams for describing examples of analyzing a image to provide an audio content according to an embodiment of the present disclosure.

Figure 4A:
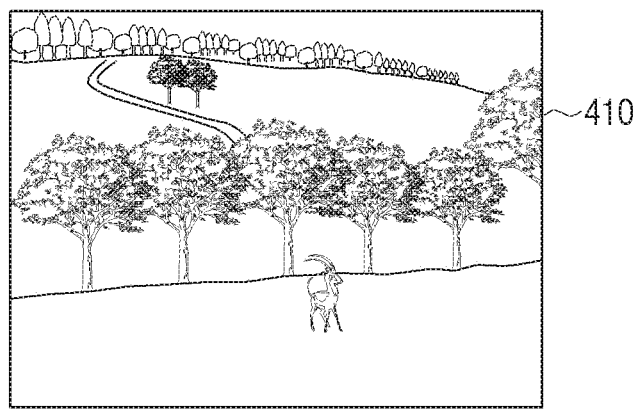
FIGS. 4A to 8B are diagrams for describing examples of analyzing a image to provide an audio content according to an embodiment of the present disclosure.
Figure 4B:
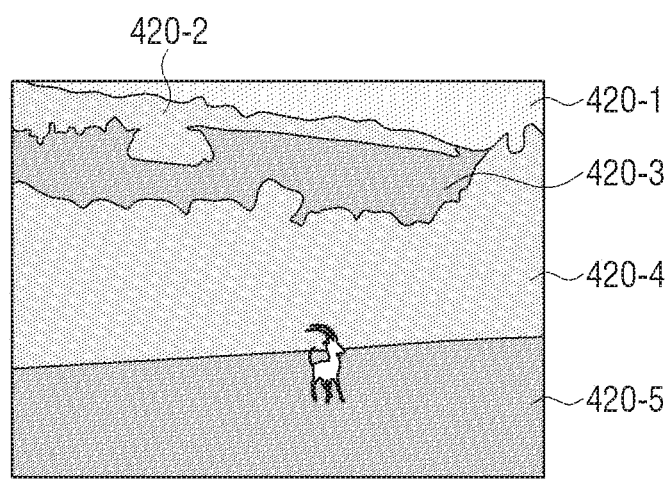

For example, referring to FIG. 4A, when a image 410 as illustrated in FIG. 4A is acquired, the controller 290 may segment the image 410 into five regions 420-1 to 420-5, as illustrated in FIG. 4B, based on the pixel analysis. In this case, the first region 420-1 may be a region in which a sky is displayed, the second region 420-2 may be a region in which a tree is displayed, the third region 420-3 may be a region in which grass is displayed, the fourth region 420-4 may be a region in which a tree is displayed, and the fifth region 420-5 may be a region in which grass is displayed. Further, the controller 290 may determine categories for the plurality of regions 420-1 to 420-5. In detail, the controller 290 may determine the first region 420-1 as a sky category, determine the second region 420-2 and the fourth region 420-4 as a grass category, and determine the third region 420-3 and the fifth region 42-5 as a tree category.

Further, the controller 290 may determine a first audio content corresponding to the sky category among the audio contents stored in the storage 250, a second audio content corresponding to the grass category, and a third audio content corresponding to the tree category. In this case, the first audio content may comprise music which may produce the impression of sky and may be, for example, "Flight of Fantasy" of a new age genre, etc. Further, the second audio content may comprise music which may produce the impression of grass and may be, for example, "Grass" of a new age genre, etc. Further, the third audio content may comprise music which may produce the impression of tree and may be, for example, "Look Down the Sea" of a new age genre, etc.

Further, the controller 290 may determine positions of the determined audio contents based on the positions of the plurality of regions to create one audio content. In detail, the controller 290 may determine the positions of the audio contents in order of regions which are positioned closest. For example, the controller 290 may determine an order of the audio contents in order of the third audio content corresponding to the fifth region 420-5, the second audio content corresponding to the fourth region 420-4, the third audio content corresponding to the third region 420-3, the second audio content corresponding to the second region 420-2, and the first audio content corresponding to the first region 420-1 as order of the regions which are positioned closest.

Further, the controller 290 may determine the playing lengths of the audio contents corresponding to the plurality of regions based on the area sizes of the plurality of regions. For example, when the playing time of the audio contents corresponding to FIG. 4A is 4 minutes in total, the controller 290 may determine the playing time of the second audio content corresponding to the fourth region 420-4 having the largest area as one and a half minutes, the playing time of the third audio content corresponding to the fifth region 420-5 as one minute and 20 seconds, the playing time of the third audio content corresponding to the third region 420-3 as 40 seconds, the playing time of the first audio content corresponding to the first region 420-1 as 20 seconds, and the playing time of the second audio content corresponding to the second region 420-2 as 10 seconds.

That is, when the image 410 as illustrated in FIG. 4A is acquired, the controller 290 may combine audio contents in order of one minute and 20 seconds-long audio contents of the third audio content corresponding to the fifth region 420-5, one and a half minutes-long audio contents of the second audio content corresponding to the fourth region 420-4, 40 seconds-long audio contents of the third audio content corresponding to the third region 420-3, 10 seconds-long audio contents of the second audio content corresponding to the second region 420-2, and 20 seconds-long audio contents of the first audio content corresponding to the first region 420-1, thereby creating one audio contents.

Further, the controller 290 may control the audio output 240 to play the created audio contents.

Meanwhile, the foregoing various embodiments of the present disclosure describe that the order of the audio contents corresponding to the regions is determined based on the positions of the regions, which is only an example. Therefore, the controller 290 may determine the positions of the audio contents in order of the area sizes of the regions. For example, the controller 290 may determine an order of the audio contents in order of the second audio content corresponding to the fourth region 420-4, the third audio content corresponding to the fifth region 420-5, the third audio content corresponding to the third region 420-3, the first audio content corresponding to the first region 420-1, and the second audio content corresponding to the second region 420-2 as an order of the region areas.

According to an embodiment of the present disclosure, the controller 290 may analyze the plurality of regions to calculate the image parameters for the analyzed regions. In this case, the image parameters may be implemented as various parameters such as, color, contrast, and chroma. Further, the controller 290 may use the composition module to acquire the audio contents corresponding to the plurality of regions based on the image parameters of the plurality of regions. In detail, the controller 290 may use the image parameters of the plurality of regions to acquire the composition parameters of the audio contents of the corresponding regions. In this case, the composition parameters may include a scale, a rhythm type, a melody, a harmony, a format, dynamics, speed, strength and weakness, a change in tone, etc. In detail, the controller 290 may write music with brighter feeling as brightness is getting higher and write music with darker feeling as brightness is getting lower. Further, the controller 290 may utilize a high-pitched tone as the chroma is getting higher and a low-pitched tone as the chroma is getting lower. Further, when a color is a warm color, the controller 290 writes music with a fast rhythm and a high-pitched tone as an active image and when a color is a cool color, the controller 290 may write music with a slow rhythm and a low-pitched tone as cool feeling. Further, the controller 290 may write music using various musical representations depending on a color, as shown by example in the following Table 1.

TABLE 1

| Color | Image | Musical representation |
| --- | --- | --- |
| Red | Passion | Fast phonetic value, running tone dotted, allegro, |
| Yellow | Cheeriness | Fast phonetic value, high-pitched tone, major |
| Green | Comfortable, Stable | Slow phonetic value, following tone, andante |
| Blue | Calmness | Quarter note, minor |
| White | Cleanness | Minor, triple time |
| Black | Darkness, Depression | Minor scale |

Further, the controller 290 may compose the audio contents corresponding to each of the plurality of regions using the composition parameters and combine the composed audio contents to create the audio contents corresponding to the image. In detail, the controller 290 may create the first audio content corresponding to the first region using a first composition parameter corresponding to the first region and create the second audio content corresponding to the second region using a second composition parameter corresponding to the second region. Further, as described above, the controller 290 may determine the playing order and the playing length depending on the size and position of the region to create one audio content based on the first audio content and the second audio content.

Further, the controller 290 may control the audio output 240 to play the created audio contents.

Figure 5A:
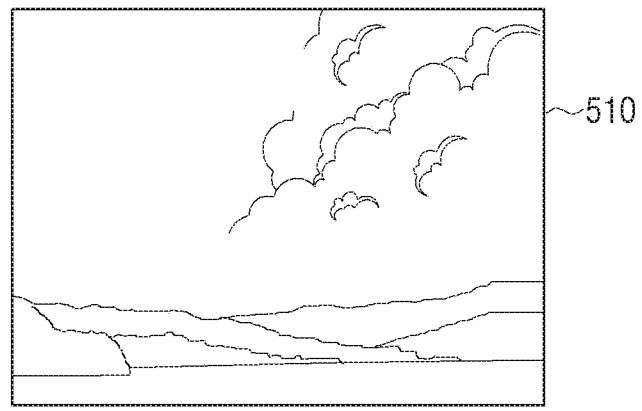
Figure 5B:
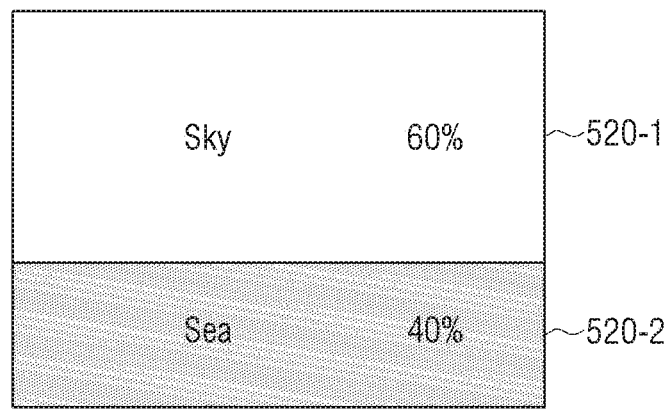

Further, the controller 290 may determine the categories of the plurality of segmented regions and create the audio contents using the composition parameters mapped to the determined categories. For example, when a image 510 as illustrated in FIG. 5A is acquired, the controller 290 may segment a region into a first region 520-1 and a second region 520-2 as illustrated in FIG. 5B. In this case, the first region 520-1 is the region 520-1 in which a sky is displayed and may occupy an area of 60% and the second region 520-2 is the region 520-2 in which a sea is displayed and may occupy an area of 40%.

Further, the controller 290 may acquire the first audio content continuously using a semiquaver and using triplet and syncopation to achieve a stable atmosphere corresponding to a sky image as the audio content corresponding to the first region 520-1. Further, the controller 290 may acquire the second audio content using major 3rd and syncopation to achieve an atmosphere of a wave sound corresponding to a sea image as the audio content corresponding to the second region 520-2.

Further, the controller 290 may determine the positions of the audio contents determined based on the positions of the plurality of regions to create one audio content. In detail, the controller 290 may determine an order of the audio contents in order of the second audio content corresponding to the second region 520-2 which is positioned closest and the first audio content corresponding to the first region 520-1.

Further, the controller 290 may determine the playing lengths of the audio contents corresponding to the plurality of regions based on the area sizes of the plurality of regions. For example, when the playing time of the audio contents corresponding to FIG. 5A is 5 minutes in total, the controller 290 may determine the playing time of the first audio content corresponding to the first region 520-1 having the largest area as 3 minutes and the playing time of the second audio content corresponding to the second region 520-2 as 2 minutes.

That is, when the image 510 as illustrated in FIG. 5A is acquired, the controller 290 combines the audio contents in order of a 2 minutes-long audio content of the second audio content corresponding to the second region 520-2 and a 3 minutes-long audio content of the first audio content corresponding to the first region 520-1 to create one audio content.

Further, the controller 290 may divide the plurality of segmented regions into a main region and a sub region, create main audio contents using the main region, and create sub audio contents using the sub region.

Figure 6A:
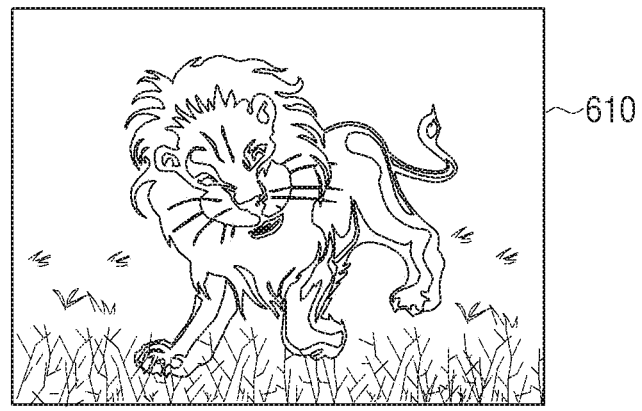
Figure 6B:
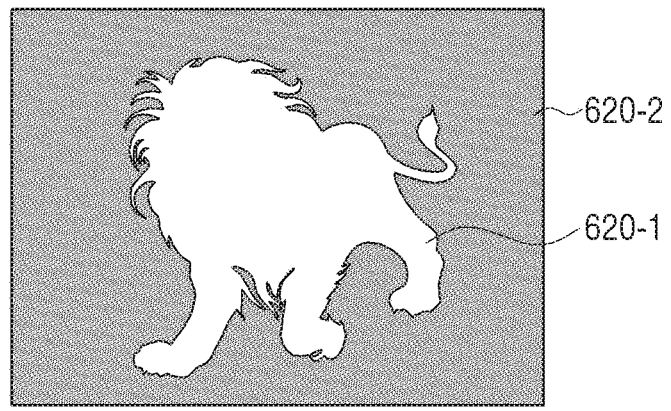

For example, when a image 610 as illustrated in FIG. 6A is input, the controller 290 may analyze the input image and segment the image into a first region 620-1 and a second region 620-2 in FIG. 6B. In this case, the first region 620-1 may be a region in which a lion is displayed and the second region 620-2 may be a region in which a grass is displayed.

Further, the controller 290 may divide the plurality of regions into the main region and the sub region based on the motion of the object and the size and position of the region, etc. For example, the controller 290 may determine the first region 620-1 in which a moving lion is displayed as the main region and determine the second region 620-2 in which a background, that is, grass is displayed as the sub region.

Further, by the foregoing method, the controller 290 may create the main audio content using the first region 620-1 which is the main region and create the sub audio content using the second region 620-2 which is the sub region. In this case, the main audio content may be an audio content having a playing time longer than that of the sub audio content. According to an embodiment of the present disclosure, the main audio content comprises an audio content of a melody line and the sub audio content may be an audio content of an accompaniment.

Therefore, the controller 290 may combine the main audio content with the sub audio content to create one audio content.

Further, when a user touch instruction is input on the first region among the plurality of regions, the controller 290 may analyze the image of the first region to which the user instruction is input and acquire the audio contents corresponding to the first region based on the analyzed results.

Figure 7A:
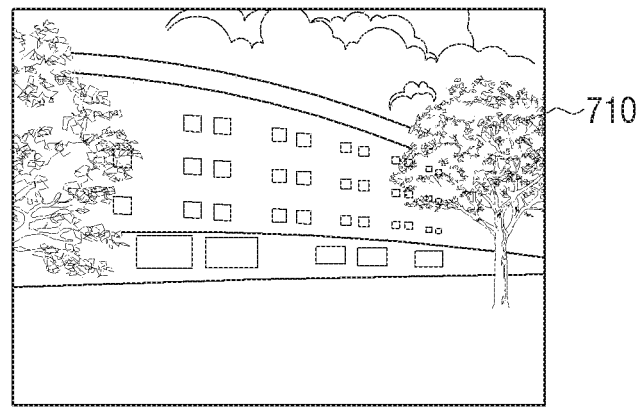
Figure 7B:
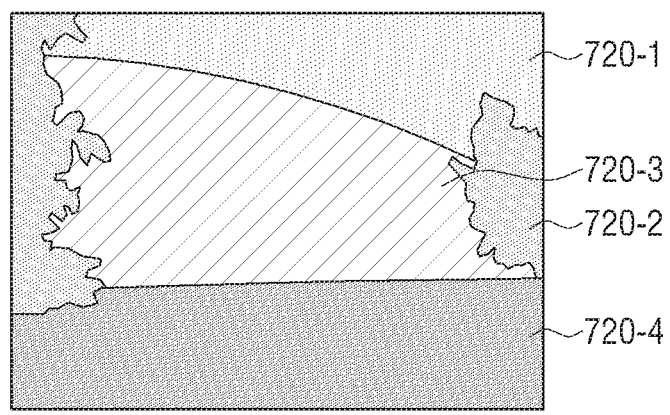

In detail, when a image 710 as illustrated in FIG. 7A is acquired, the image 710 may be divided into first to fourth regions 720-1 to 720-4 as illustrated in FIG. 7B. In this case, the first region 720-1 may be a region in which a sky is displayed, the second region 720-2 may be a region in which a tree is displayed, the third region 720-3 may be a region in which a building is displayed, and the fourth region 720-4 may be a region in which earth is displayed.

Figure 7C:
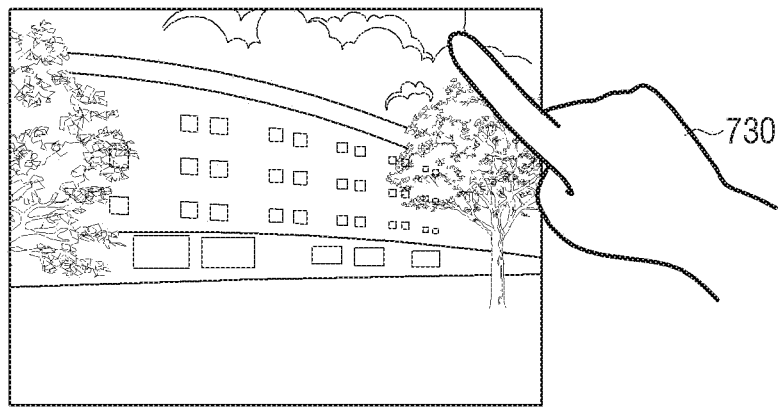

Further, as illustrated in FIG. 7C, if a user touch 730 touching the first region 720-1 is input, the controller 290 may analyze the first region 720-1 to which the user touch 730 is input to create the audio contents corresponding to the first region. For example, the controller 290 may determine the category of the first region 720-1 in which a sky is displayed as a sky category and create the first audio content corresponding to the sky category. In this case, if the user touch touching the first region 720-1 is input, the controller 290 may control the haptic provider 280 to provide the haptic feedback to the first region.

Figure 8A:
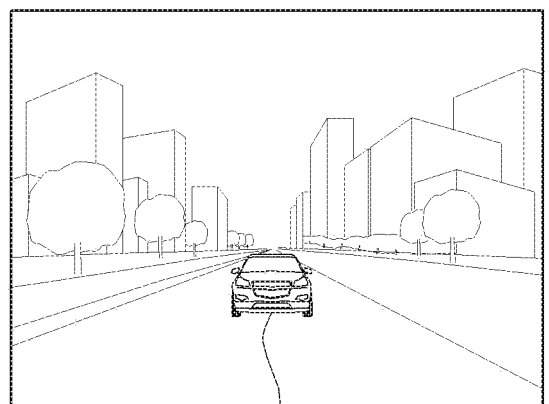
Figure 8B:
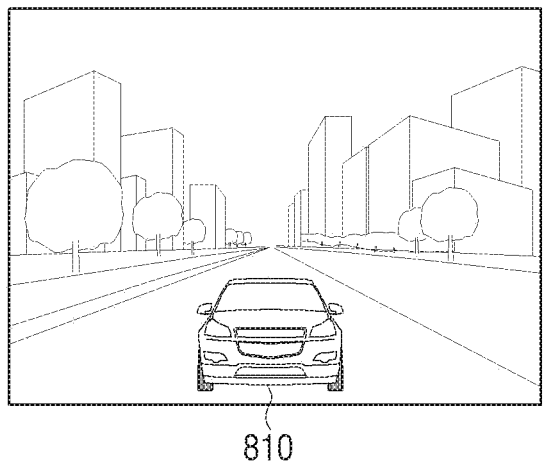

Further, the controller 290 may determine the motion of the object included in the first region among the plurality of regions and create the audio contents including information corresponding to the motion of the object included in the first region. For example, as illustrated in FIGS. 8A and 8B, when a vehicle 810 moves in a image, the controller 290 may include a horn as information corresponding to the moving vehicle in an element of the audio contents to create the audio contents. As a result, the user may more intuitively confirm the information on the currently displayed image based on audio elements (for example, horn) included in the audio contents.

Further, the controller 290 may add the sound corresponding to the objects included in the plurality of current regions as the audio element to create the audio contents. For example, when a gull and a wave are included as objects included in the image, the controller 290 may create the audio contents including a gull sound and a wave sound as the audio element.

Figure 9:
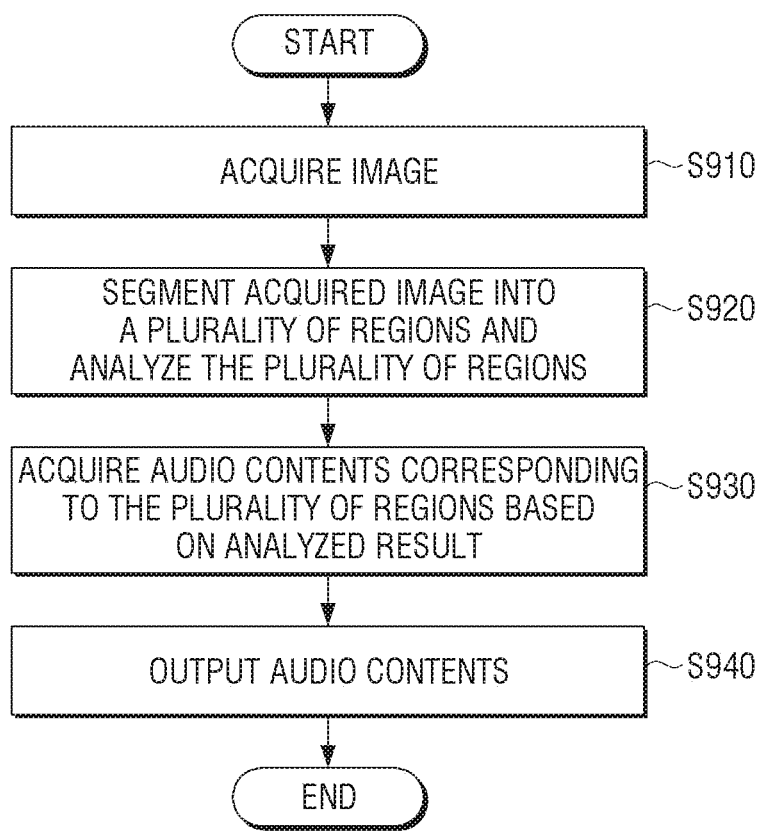
FIG. 9 is a flow chart for describing a method for controlling an electronic device according to an embodiment of the present disclosure.

FIG. 9 is a flow chart for describing a method of controlling an electronic device, e.g., the electronic device 100 of FIG. 1, according to an embodiment of the present disclosure.

Referring to FIG. 9, the electronic device 100 acquires a image in operation S910. In this case, the electronic device 100 may photograph a image using a camera or receive a image from an external device.

Further, the electronic device 100 segments the acquired image into a plurality of regions and analyzes the plurality of regions in operation S920. In detail, the electronic device 100 may segment the acquired image into the plurality of regions based on pixel analysis, scene categorization, object recognition, or the like and analyze the plurality of regions to determine image parameters or categories of the plurality of regions.

Further, the electronic device 100 acquires the audio contents corresponding to the plurality of regions based on the analyzed results in operation S930. In detail, the electronic device 100 may retrieve the audio contents corresponding to the image categories of the plurality of regions to acquire the audio contents. Further, the electronic device 100 may calculate the image parameters of the plurality of regions and acquire the audio contents using the composition parameters corresponding to the image parameters.

Further, the electronic device 100 outputs the acquired audio contents in operation S940.

As described above, by segmenting the image into the plurality of regions, acquiring the audio contents corresponding to the plurality of segmented regions, and combining the plurality of acquired audio contents into one audio content, the user may receive the atmosphere or information on the currently displayed image through the audio contents in an auditory form.

Hereinafter, an example of inserting region guide information into a image and providing it according to an embodiment of the present disclosure will be described with reference to FIGS. 10 to 22.

Figure 10:
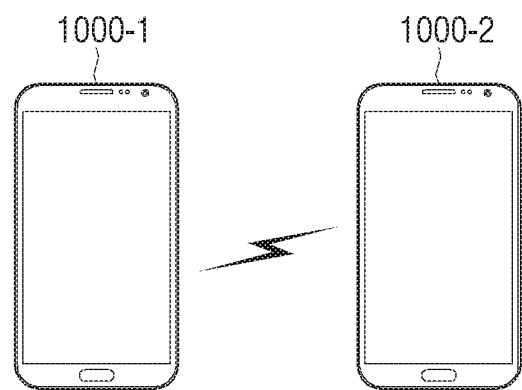
FIG. 10 is a diagram illustrating a content providing system according an embodiment of the present disclosure.

FIG. 10 is a diagram for describing an information providing system according to an embodiment of the present disclosure.

Referring to FIG. 10, the information providing system may include an electronic device 1000-2 and an external device 1000-1. In this case, the external device 1000-1 and the electronic device 1000-2 may both be a smart phone, which is only an example. Therefore, the external device 1000-1 and the electronic device 1000-2 may be implemented as other electronic devices such as a tablet PC and a smart TV.

Meanwhile, according to an embodiment of the present disclosure, the external device 1000-1 may be a smart phone which an individual who suffers from blindness uses, and the electronic device 1000-2 may be a smart phone which a volunteer uses.

In detail, the external device 1000-1, which the individual who suffers from blindness uses, acquires a image according to the user instruction and transmits the acquired image to the electronic device 1000-2. In this case, the external device 1000-1 may transmit moving pictures. Meanwhile, the external device 1000-1 may transmit all frames of the acquired moving pictures, which is only an example. Therefore, the external device 1000-1 may transmit only a key frame of the acquired image.

The electronic device 1000-2 may insert the region guide information into the received image and again transmit the image into which the region guide information is inserted to the external device 1000-1. In detail, the electronic device 1000-2 may insert the region guide information input by a volunteer into a image. Further, the electronic device 1000-2 may analyze the received image to insert the region guide information into a image. In this case, the region guide information comprises information describing at least one region included in a image and may be the information in the audio data format, which is only an example. Therefore, the region guide information may be various types of information such as vibrations, fragrance, and text.

Further, the external device 1000-1 may play the image into which the region guide information is inserted.

Hereinafter, a method for inserting region guide information by the electronic device 1000-2 according to various embodiments of the present disclosure will be described in more detail with reference to FIGS. 11A to 18.

FIGS. 11A to 18 are diagrams for describing an example of inserting region guide information into a image and providing it according to the second embodiment of the present disclosure.

According to an embodiment of the present disclosure, the external device 1000-1 may acquire moving picture data. In this case, the external device 1000-1 may acquire the moving picture data through the camera and receive the moving picture data from the outside.

Further, the external device 1000-1 may transmit the acquired moving picture data to the electronic device 1000-2. In this case, the external device 1000-1 may transmit all frames of the acquired moving picture data, which is only an example. Therefore, the external device 1000-1 may transmit only key frames among all the frames of the moving picture data. In this case, the key frame may mean one of a plurality of frames providing a similar scene.

The electronic device 1000-2 may display the transmitted moving picture data. Further, if the user instruction is input while the moving picture data are displayed and the user voice corresponding to the region guide information is input, the electronic device 1000-2 may insert the region guide information corresponding to the user voice into at least some frames among the moving picture data according to the user instruction. For example, if the user instruction is input while a first scene among the moving picture data is displayed and a first voice (for example, voice "this scene displays that there are flowers and a windmill") of a volunteer is input to insert the region guide information into the first scene, the electronic device 1000-2 may insert the first voice of the volunteer as the region guide information into the first scene. In this case, the electronic device 1000-2 may tag voice data for the first voice of the volunteer to the first scene to insert the region guide information into the moving picture data. Further, if the user instruction is input while a second frame among the moving picture data is displayed and a second voice (for example, voice "this scene displays that there are sea and sky") of a volunteer for inserting the region guide information into the second scene is input, the electronic device 1000-2 may tag data corresponding to the second voice of the volunteer to the second scene to insert the second voice of the volunteer into the second scene. As a result, the individual who suffers from blindness may confirm the content or atmosphere of the corresponding frame based on the region guide information while the corresponding scene is displayed.

Meanwhile, the electronic device 1000-2 may synchronize a scene to be input by the user in the moving picture data with the region guide information and insert it. In particular, the electronic device 1000-2 may change an insertion position of the region guide information to be inserted to synchronize the scene to be input by the user with the region guide information.

Figure 11A:
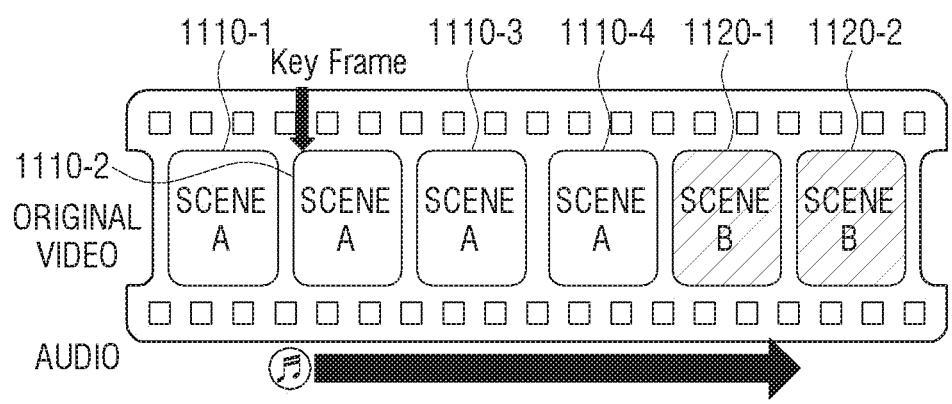
FIGS. 11A to 18 are diagrams for describing an example of inserting region guide information into a image and providing it according to an embodiment of the present disclosure.

In detail, referring to FIG. 11A, when, as the moving picture data, first to fourth frames 1110-1 to 1110-4 as a image frame for scene A, and fifth and sixth frames 1120-1 and 1120-2 as a image frame for scene B are received, the electronic device 1000-2 may determine the second frame 1110-2 as a key frame for inserting the region guide information according to the user instruction.

Further, the electronic device 1000-2 may insert region guide information in an audio form to be played from the second frame 1110-2 to the fifth frame 1120-1 according to the user voice. In this case, when the region guide information is provided up to the fifth frame 1120-1, the phenomenon that the currently displayed scene and the region guide information in the audio form are mismatched with each other may occur. That is, as illustrated in FIG. 11A, the mismatch phenomenon that the region guide information on the scene A is output while the fifth frame 1120-1 which is the scene B is displayed occurs.

Figure 11B:
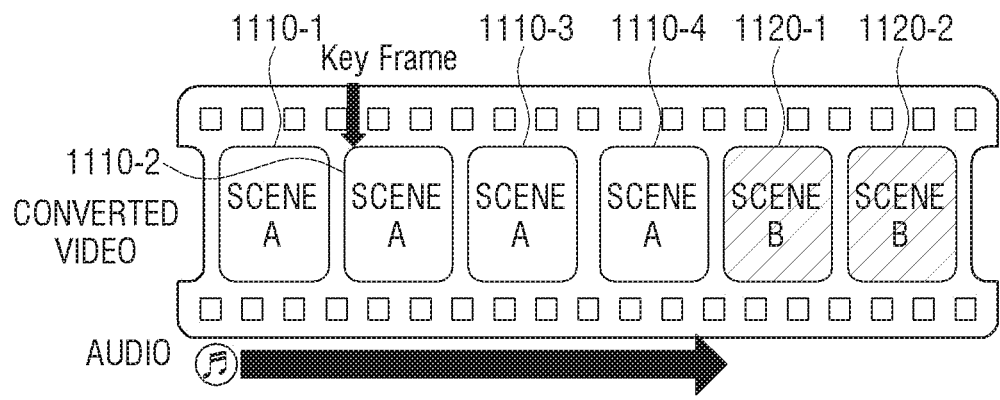

Therefore, referring to FIG. 11B, the electronic device 1000-2 may synchronize the region guide information in the audio form with a image to allow the region guide information to start from the first frame 1110-1 included in the scene A.

Further, the electronic device 1000-2 may synchronize the scene to be input by the user with the region guide information using a copy frame.

Figure 12A:
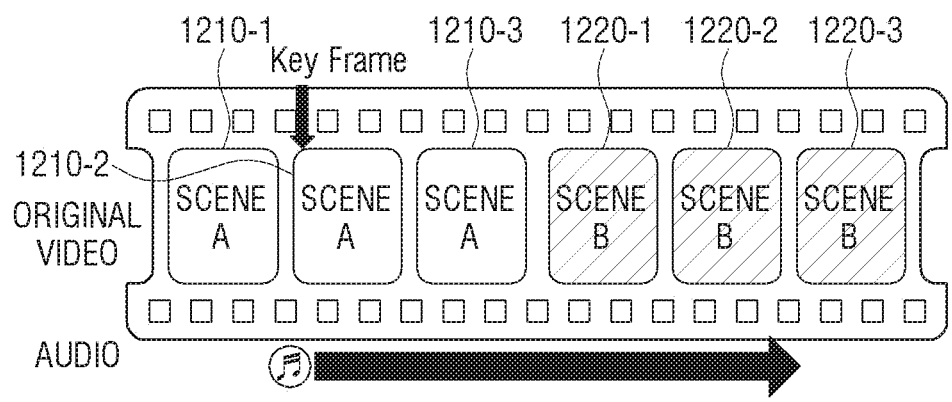

In detail, referring to FIG. 12A, when, as the moving picture data, first to third frames 1210-1 to 1210-3 as a image frame for scene A and fourth to sixth frames 1220-1 to 1220-3 as a image frame for scene B are received, the electronic device 1000-2 may determine the second frame 1210-2 as a key frame for inserting the region guide information according to the user instruction.

Further, the electronic device 1000-2 may insert region guide information in an audio form to be played from the second frame 1210-2 to the fifth frame 1220-2 according to the user voice. In this case, when the region guide information is provided up to the fifth frame 1220-2, the phenomenon that the currently displayed scene and the region guide information in the audio form are mismatched with each other may occur. Further, when the playing time during which the region guide information on the scene A is provided is 4 frame sections, there is a problem in that the region guide information is provided exceeding 3 frame sections corresponding to the scene A.

Figure 12B:
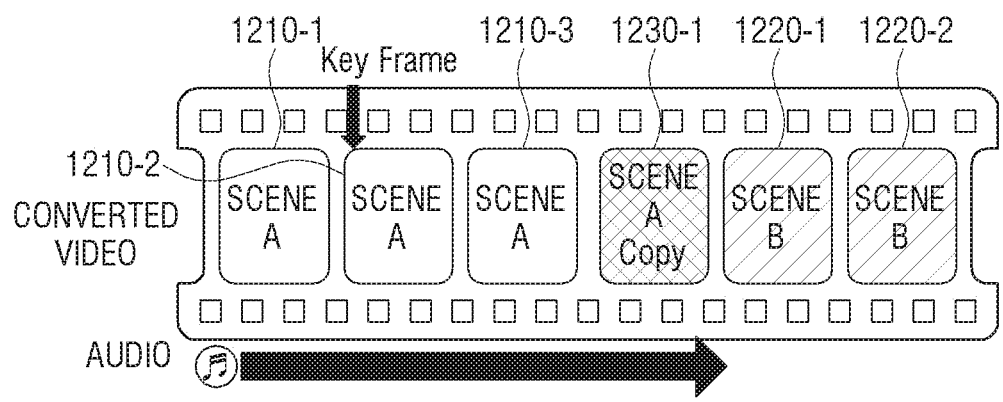

Therefore, referring to FIG. 12B, the electronic device 1000-2 may set the region guide information in the audio form to allow the region guide information to start from the first frame 1210-1 included in the scene A and insert a seventh frame 1230-1 copying the third frame 1210-3 between the third frame 1210-3 and the fourth fame 1220-1. By this, the electronic device 1000-2 may synchronize the region guide information on the scene A with the scene A and play it.

Figure 13A:
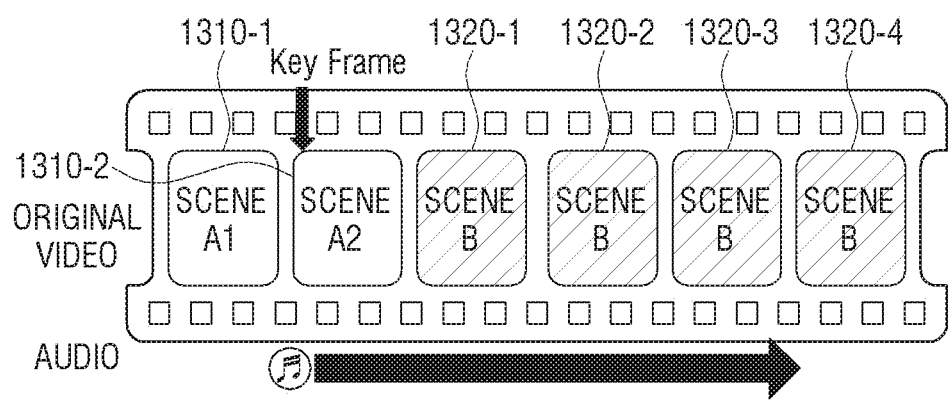

According to an embodiment of the present disclosure, referring to FIG. 13A, when, as the moving picture data, first and second frames 1310-1 and 1310-2 as the image frame for the scene A and third to sixth frames 1320-1 to 1320-4 as the image frame for the scene B are received, the electronic device 1000-2 may determine the second frame 1310-2 as the key frame for inserting the region guide information according to the user instruction.

Further, the electronic device 1000-2 may insert the region guide information in an audio form to be played from the second frame 1310-2 to the fifth frame 1320-3 according to the user voice. In this case, when the region guide information is provided up to the fifth frame 1320-3, the phenomenon that the currently displayed scene and the region guide information in the audio form are mismatched with each other may occur. Further, when the playing during which the region guide information on the scene A is provided is 4 frame sections, there is a problem in that the region guide information is provided exceeding two frame sections corresponding to the scene A.

Figure 13B:
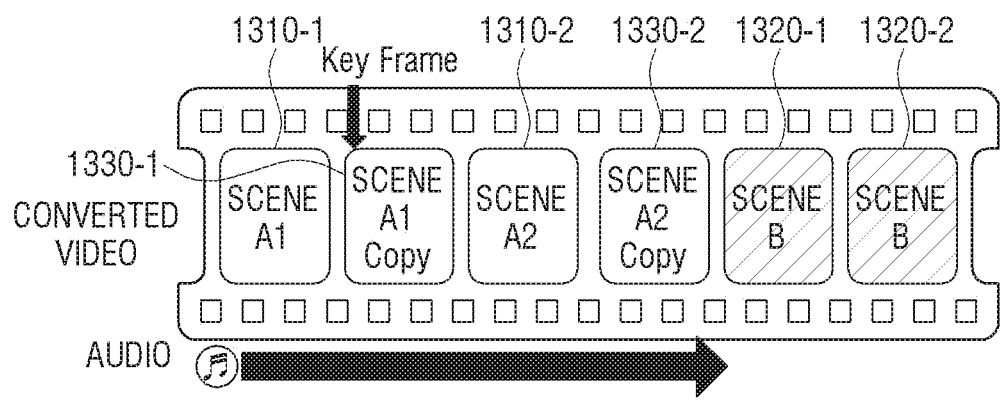

Therefore, referring to FIG. 13B, the electronic device 1000-2 may set the region guide information in the audio form to allow the region guide information to start from the first frame 1310-1 included in the scene A, insert a seventh frame 1330-1 copying the first frame 1310-1 between the first frame 1310-1 and the second frame 1310-2, and insert an eighth frame 1330-2 copying the second frame 1310-2 between the second frame 1310-2 and the third frame 1320-1. By this, the electronic device 1000-2 may synchronize the region guide information on the scene A with the scene A and play it.

Further, the electronic device 1000-2 may synchronize the scene to be input by the user with the region guide information using an interpolation frame.

Figure 14A:
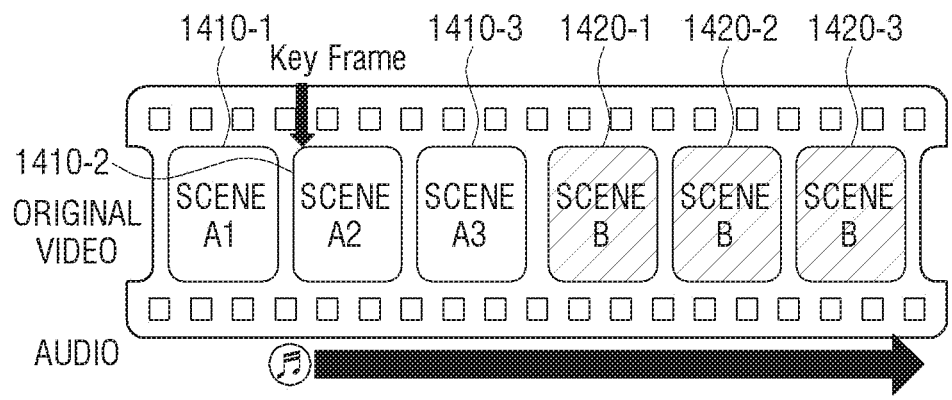

In detail, referring to FIG. 14A, when, as the moving picture data, first to third frames 1410-1 to 1410-3 as a image frame for scene A and fourth to sixth frames 1420-1 to 1420-3 as a image frame for scene B are received, the electronic device 1000-2 may determine the second frame 1410-2 as a key frame for inserting the region guide information according to the user instruction.

Further, the electronic device 1000-2 may insert the region guide information in an audio form to be played from the second frame 1410-2 to the sixth frame 1420-3 according to the user voice. In this case, when the region guide information is provided up to the sixth frame 1420-3, the phenomenon that the currently displayed scene and the region guide information in the audio form are mismatched with each other may occur. Further, when the playing time during which the region guide information on the scene A is provided is 5 frame sections, there is a problem in that the region guide information is provided exceeding 3 frame sections corresponding to the scene A.

Figure 14B:
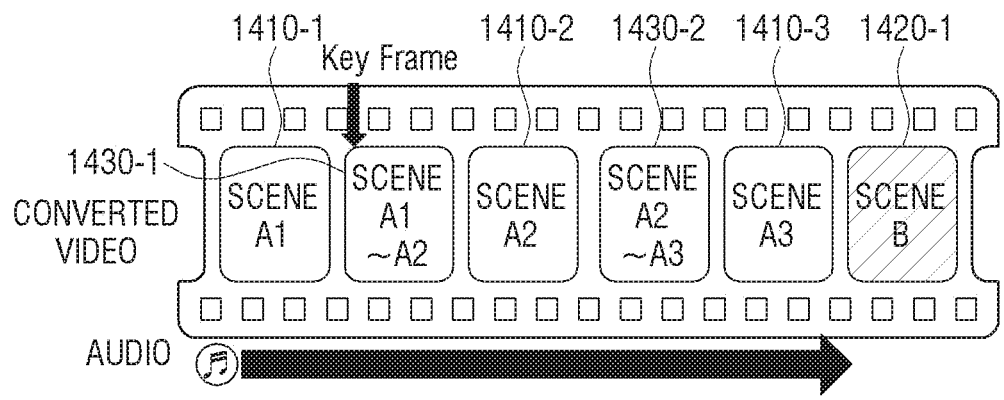

Therefore, referring to FIG. 14B, the electronic device 1000-2 may set the region guide information in the audio form to allow the region guide information to start from the first frame 1210-1 included in the scene A, insert the seventh frame 1430-1 interpolating the first frame 1410-1 and the second frame 1410-2 between the first frame 1410-1 and the second frame 1410-2, and insert an eighth frame 1430-2 interpolating the second frame 1410-2 and the third frame 1410-3 between the second frame 1410-2 and the third frame 1410-3. In this case, the interpolation frames may be generated by using a motion vector, a pixel change, etc., of two frames used to generate the interpolation frame. By this, the electronic device 1000-2 may play the region guide information on the scene A by synchronizing the region guide information with the scene A and naturally increase the number of frames of the scene A.

Further, the electronic device 1000-2 may insert the region guide information synchronized with the image into the image and transmit it to the external device 1000-1.

Meanwhile, the foregoing embodiment of the present disclosure describes that the region guide information comprises the information in the audio form, which is only an example. Therefore, the region guide information may be implemented as various types of information such as text, fragrance, and vibrations.

According to an embodiment of the present disclosure, the external device 1000-1 may acquire moving picture data. In this case, the external device 1000-1 may acquire the moving picture data through the camera and receive the moving picture data from the outside.

Further, the external device 1000-1 may transmit the acquired moving picture data to the electronic device 1000-2. In this case, the external device 1000-1 may transmit all frames of the acquired moving picture data, which is only an example. Therefore, the external device 1000-1 may transmit only key frames among all the frames of the moving picture data. In this case, the key frame may mean one of a plurality of frames providing a similar scene.

The electronic device 1000-2 may display the transmitted moving picture data. Further, if the user instruction is input while the moving picture data are displayed, the electronic device 1000-2 may segment the image received from the external device 1000-1 into a plurality of regions, analyze the plurality of segmented regions to generate the region guide information corresponding to the plurality of regions, and insert the acquired region guide information into the image and transmit it to the external device 1000-1.

In particular, the electronic device 1000-2 may recognize a text included in the received image using an optical character recognition (OCR), or analyze a category corresponding to the image.

Figure 15A:
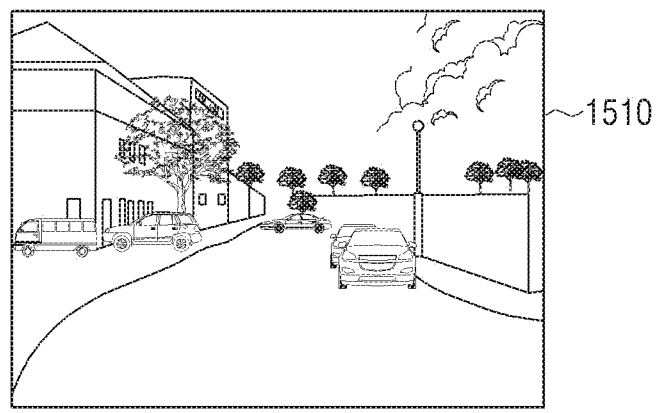
Figure 15B:
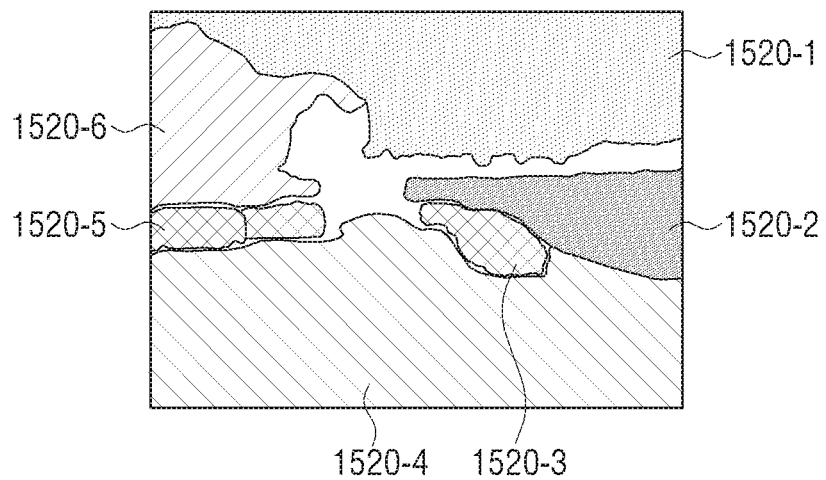

In detail, when a image 1510 referring to FIG. 15A is received, the electronic device 1000-2 may use pixel analysis to segment the received image 1510 into first to sixth regions 1520-1 to 1520-6 in FIG. 15B. In this case, a sky is displayed in the first region 1520-1, a park is displayed in the second region 1520-2, a vehicle is displayed in the third region 1520-3 and the fifth region 1520-5, a road is displayed in the fourth region 1520-4, and a building is displayed in the sixth region 1520-6.

Further, the electronic device 1000-2 may analyze a category corresponding to a image based on the pixel analysis. That is, the electronic device 1000-2 may determine the first region 1520-1 as a sky category, determine the second region 1520-2 as a park category, the third region 1520-3 and the fifth region 1520-5 as a vehicle category, the fourth region 1520-4 as a road category, and the sixth region 1520-6 as a building category, based on the pixel analysis.

Further, the electronic device 1000-2 may insert the region guide information based on the determined categories. In detail, when the image 1510 as illustrated in FIG. 15A is input, the electronic device 1000-2 may generate the region guide information "this scene displays that a park, a building, and a road are positioned below a sky and vehicles are on the road" according to the positions of the plurality of regions and tag it to the image 1510.

Figure 16A:
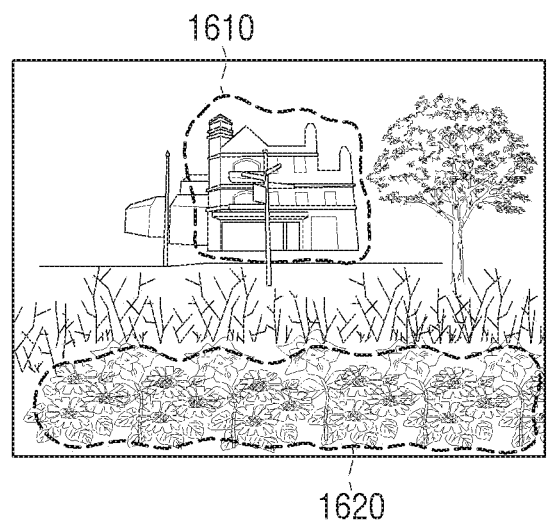

Further, the electronic device 1000-2 may segment the image into the plurality of regions according to the user input. In detail, when a image as illustrated in FIG. 16A is received, if a user instruction outlining a building position and a user instruction outlining a flower garden position are input, the electronic device 1000-2 may set a region 1610 in which a building is positioned as a first region and a region 1620 in which a flower garden is positioned as a second region.

Further, the electronic device 1000-2 may analyze the first region 1610 and the second region 1620 to determine categories corresponding to the first region 1610 and the second region 1620. For example, the electronic device 1000-2 may determine the category of the first region 1610 as a building category and the category of the second region 1620 as a flower category.

Further, the electronic device 1000-2 may insert the region guide information "this scene displays that there is a building and this scene displays that there is a flower garden" into a image based on the determined category. In this case, the region guide information may be the information in the audio form generated by a text-to-speech (TTS), which is only an example. Therefore, the region guide information may be text information. When the region guide information is the text information, the electronic device 1000-2 may insert the text information into one region of the image and transmit the image into which the text information is inserted to the external device 1000-1.

Figure 16B:
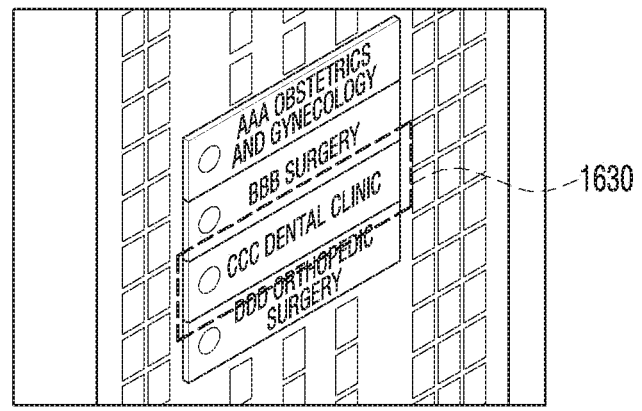

According to an embodiment of the present disclosure, when a image as illustrated in FIG. 16B is received, if a user instruction touching a region in which "CCC dental clinic" is displayed is input, the electronic device 1000-2 may set a region in which a signboard of the CCC dental clinic is displayed as the first region.

Further, the electronic device 1000-2 may analyze the text displayed in the first region 1630 based on the OCR recognition. For example, the electronic device 1000-2 may confirm that the text "CCC dental clinic" is present in the first region 1630 based on the OCR recognition.

Further, the electronic device 1000-2 may insert the region guide information "this scene displays that there is the CCC dental clinic" into a image based on the determined text. In this case, the region guide information may be the information in the audio form generated by the TTS, which is only an example. Therefore, the region guide information may be the text information. When the region guide information is the text information, the electronic device 1000-2 may insert the text information into one region of the image and transmit the image into which the text information is inserted to the external device 1000-1.

Further, the electronic device 1000-2 may insert the region guide information on one screen without segmenting the received image into the plurality of regions and insert the region guide information corresponding to the plurality of regions along with the positions of the regions.

Figure 17A:

In detail, when a image 1710, referring to FIG. 17A, is received, the electronic device 1000-2 may insert region guide information on one image 1710 by analyzing one image 1710 without segmenting the image 1710 into the plurality of regions. For example, the electronic device 1000-2 may insert region guide information "this scene is a birthday party screen of Suzan" into the image 1710.

Figure 17B:
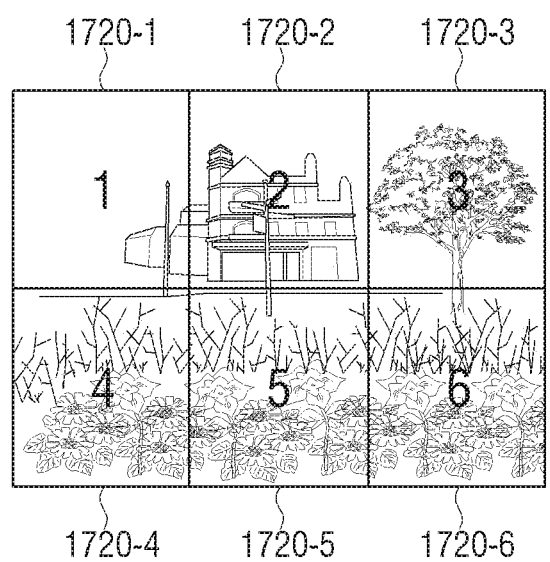
Figure 17C:
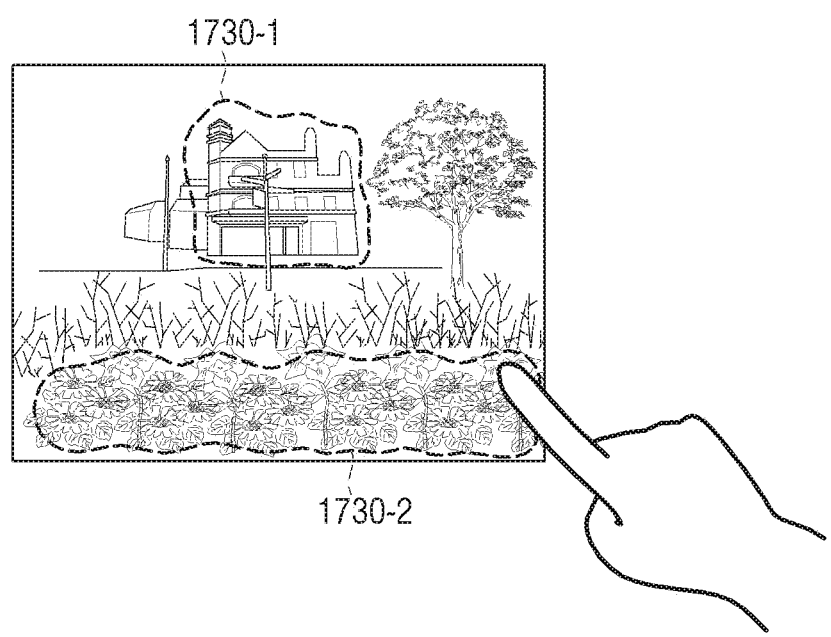
Figure 18:
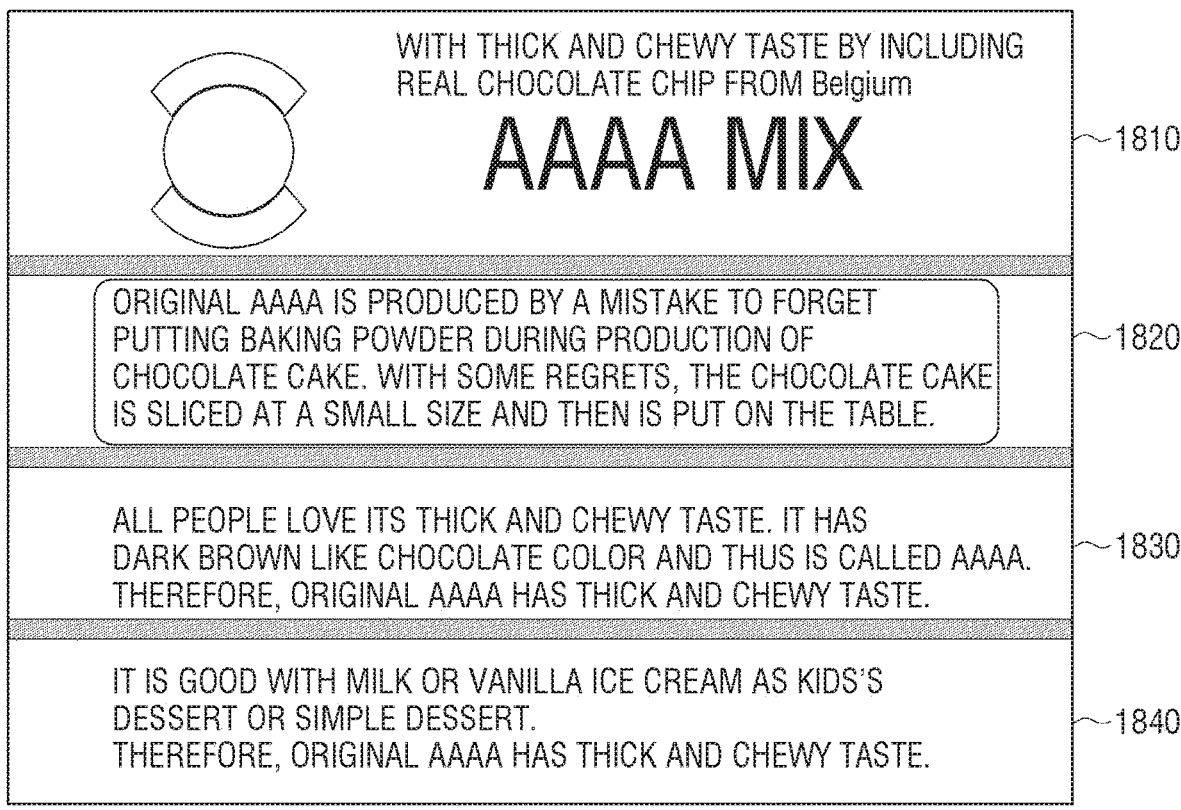

Further, when a image, referring to FIG. 17B, is received, the electronic device 1000-2 may divide a screen into six regions 1720-1 to 1720-6 and insert region guide information on the six regions 1720-1 to 1720-6 along with the corresponding positional information. In this case, the first region 1720-1 is at an upper left, the second region 1720-2 is at an upper center, the third region 1720-3 is at an upper right, the fourth region 1720-4 is at a lower left, the fifth region 1720-5 is at a lower center, and the sixth region 1720-6 is at a lower right. For example, the electronic device 1000-2 may analyze the image of FIG. 17B to insert the region guide information "this scene displays that a sky is at an upper left, a building is at an upper center, a tree is at an upper right, and flower gardens are at a lower left, a lower center, and a lower right" into the image.

Further, to synchronize the region guide information with the screen, the electronic device 1000-2 may change a start position at which the region guide information is inserted as described in FIGS. 11A to 14B. Further, when the playing length of the region guide information is longer than that of the image, the electronic device 1000-2 may insert at least one of the copy frame and the interpolation frame into the image as illustrated in FIGS. 12A to 14B.

Further, the electronic device 1000-2 may add the region guide information generated by various methods as described above to the image and transmit it to the external device 1000-1.

The external device 1000-1 may receive the image into which the region guide information is inserted. In this case, the individual who suffers from blindness using the external device 1000-1 may receive the image into which the region guide information in the audio form is inserted and thus may more intuitively confirm the image.

In this case, the external device 1000-1 may output the region guide information on the whole image along with the image, which is only an example. Therefore, the external device 1000-1 may provide only the region guide information on some regions to the user according to the user instruction. For example, when the image into which the region guide information is inserted by the method described in FIG. 16A is received, referring to FIG. 17C which has a first region 1730-1 and a second region 1730-2, if the user instruction touching the second region 1730-2 of the image is input, the external device 1000-1 may provide the haptic feedback for the region to which the region guide information is input and provide the region guide information (for example, "this scene displays that there is a flow garden") on the region to which the user instruction is input.

Meanwhile, the foregoing embodiment of the present disclosure describes that one external device 1000-1 transmits a image to one electronic device 1000-2, which is only an example. Therefore, one external device 1000-1 may segment a image and transmit the image to a plurality of electronic devices. For example, referring to FIG. 18, when a image includes many texts, there is a problem in that one electronic device 1000-2 takes much time to analyze the image. Therefore, the external device 1000-1 may segment a image into first to fourth regions 1810, 1820, 1830, and 1840 and may transmit the segmented first to fourth regions 1810, 1820, 1830, and 1840 to first to fourth electronic devices, respectively. Further, the external device 1000-1 may receive images into which the region guide information is inserted from each of the electronic devices, combine the images and play the combined images. That is, the external device 1000-1 may receive the image into which the region guide information on the whole image is inserted.

Figure 19:
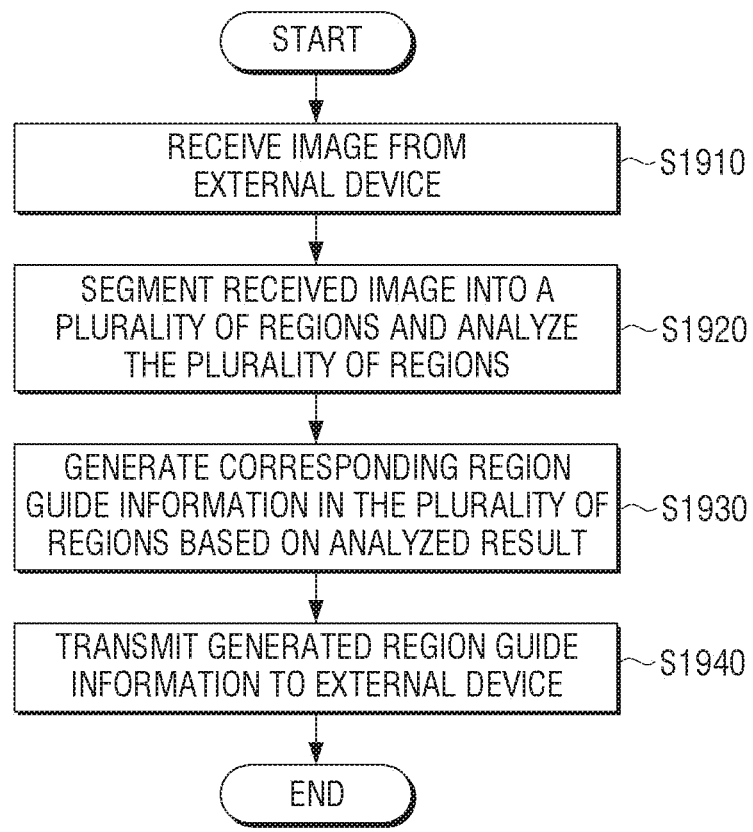
FIG. 19 is a flow chart for describing a method for controlling an electronic device according to an embodiment of the present disclosure.

FIG. 19 is a flow chart for describing a method of controlling an electronic device 1000-2 according to an embodiment of the present disclosure.

Referring to FIG. 19, the electronic device 1000-2 receives a image from the external device 1000-1 in operation S1910. In this case, the electronic device 1000-2 may receive the whole image from the external device 1000-1, which is only an example. Therefore, the electronic device 1000-2 may receive only the key frame of the scene included in the image.

Further, the electronic device 1000-2 segments the received image into a plurality of regions and analyzes the plurality of regions in operation S1920. In this case, the electronic device 1000-2 may detect the text included in the region based on the OCR recognition or determine the category corresponding to the region based on the pixel analysis.

Further, the electronic device 1000-2 generates the region guide information corresponding to the plurality of regions based on the analyzed results in operation S1930.

Further, the electronic device 1000-2 transmits the generated region guide information to the external device 1000-1 in operation S1940. In this case, the electronic device 1000-2 may insert the region guide information and transmit it to the external device 1000-1, which is only an example. Therefore, the electronic device 1000-2 may transmit only the region guide information to the external device 1000-1.

Figure 20:
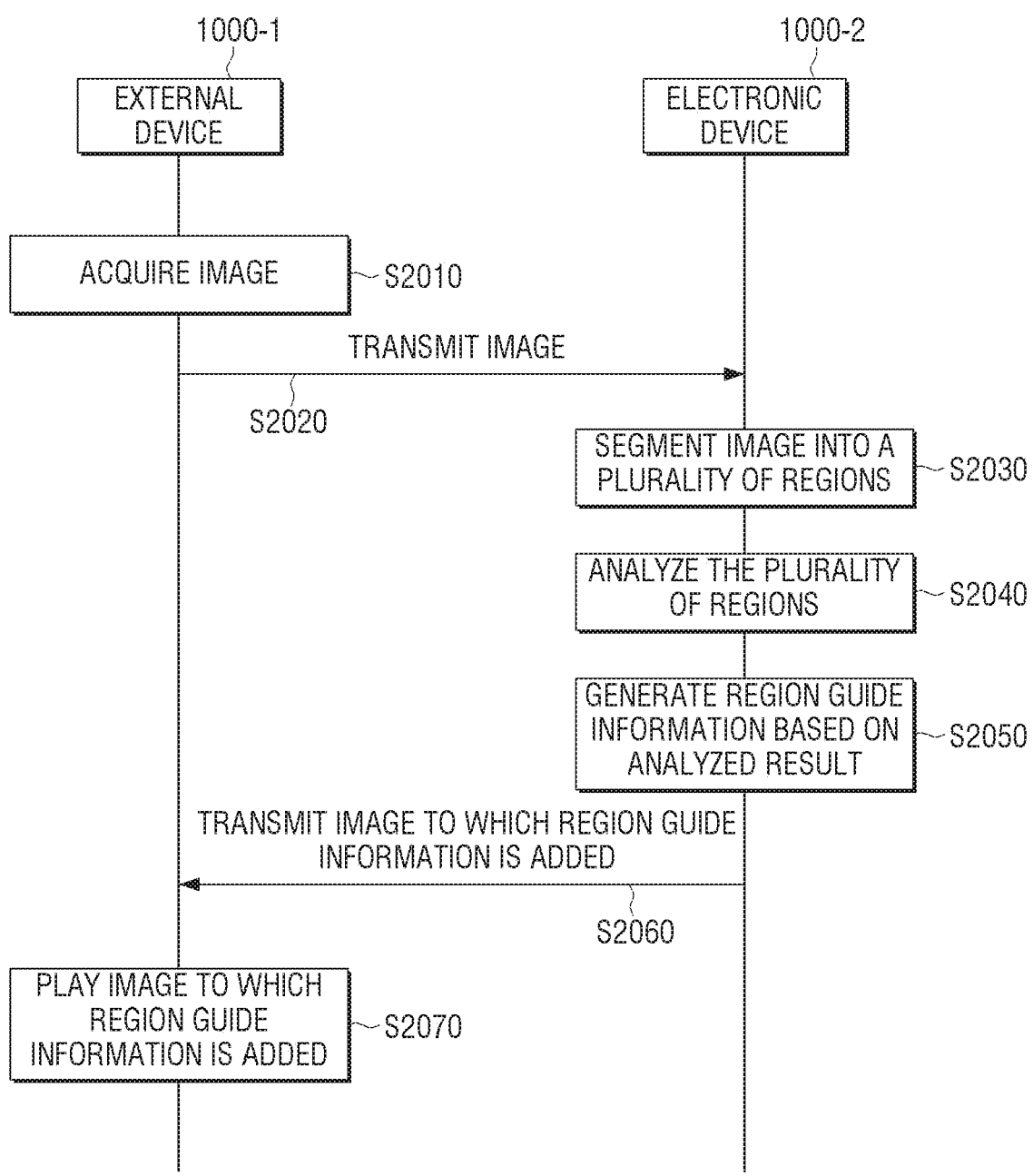
FIGS. 20 and 21 are sequence diagrams for describing a method for providing a image into which an audio is inserted by a content providing system according to an embodiment of the present disclosure.

FIG. 20 is a sequence diagram for describing a method for controlling an information providing system providing a image into which region guide information is inserted, by allowing the electronic device 1000-2 to automatically analyze the image according to an embodiment of the present disclosure.

Referring to FIG. 20, the external device 1000-1 acquires a image in operation S2010. In this case, the external device 1000-1 may acquire a image by photographing the image using the camera, which is only an example. Therefore, the external device 1000-1 may acquire images from other devices.

Further, the external device 1000-1 may transmit the acquired image to the electronic device 1000-2 in operation S2020.

Further, the electronic device 1000-2 segments the image into a plurality of regions in operation S2030 and analyzes the plurality of regions in operation S2040. In this case, the electronic device 1000-2 may determine categories corresponding to a plurality of regions by various methods such as various pixel analyses and OCR recognitions or recognize texts included in the plurality of regions.

Further, the electronic device 1000-2 generates region guide information based on the analyzed results in operation S2050. In detail, the electronic device 1000-2 may provide the region guide information based on the categories corresponding to each of the plurality of regions or the texts included in the plurality of regions. In this case, the region guide information may include the positional information of the corresponding region. Further, the region guide information may be the information in the audio form, which is only on example. Therefore, the region guide information may be various types of information such as text, sound, and vibration.

Further, the electronic device 1000-2 transmits the image to which the region guide information is added to the external device 1000-1 in operation S2060.

Further, the electronic device 1000-2 may play the image to which the region guide information is added in operation S2070.

Figure 21:
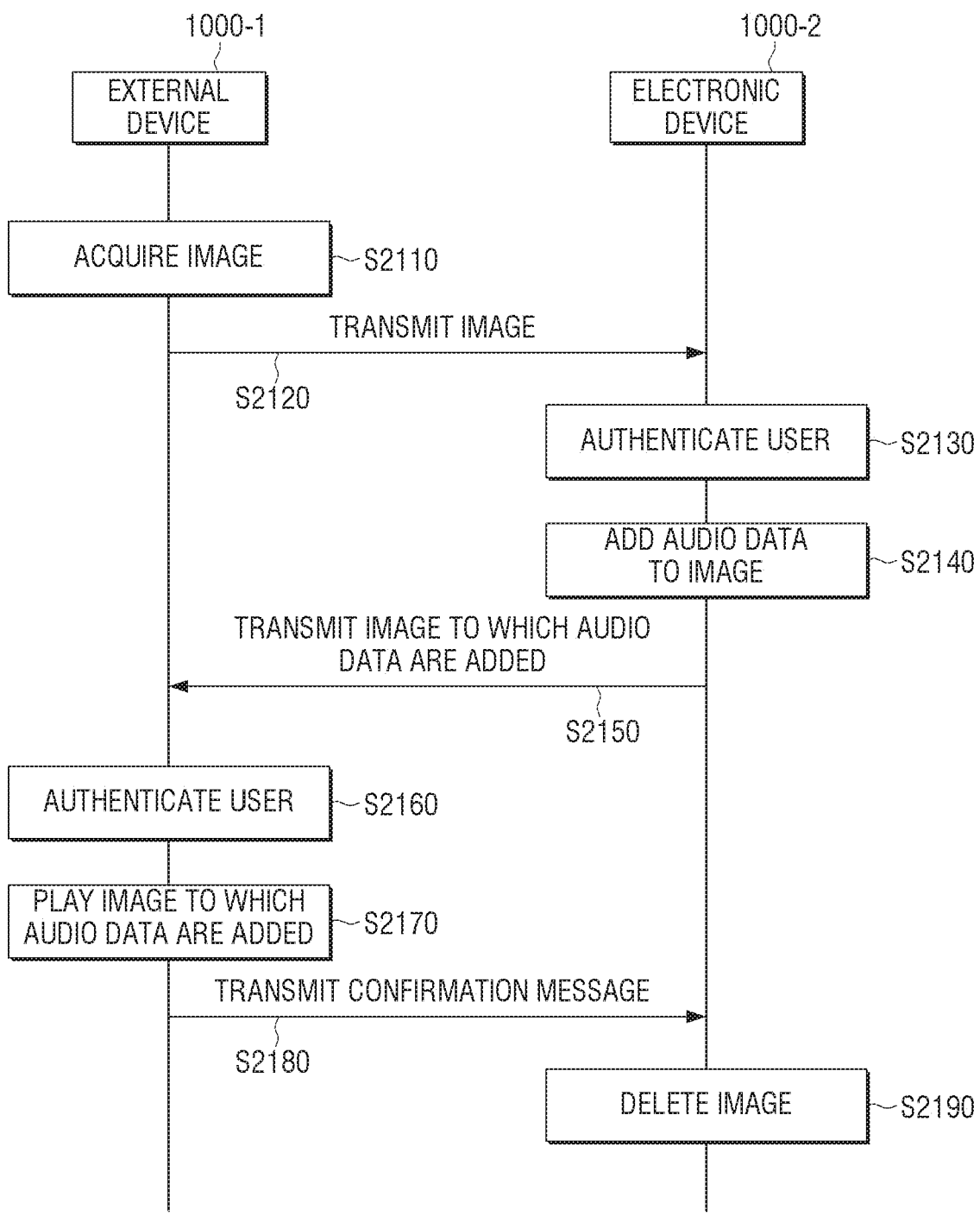

FIG. 21 is a sequence diagram for describing a method for controlling an information providing system providing a image into which audio data input by a volunteer are inserted according to an embodiment of the present disclosure.

Referring to FIG. 21, the external device 1000-1 acquires a image in operation S2110. In this case, the external device 1000-1 may acquire a image by photographing the image using the camera, which is only an example. Therefore, the external device 1000-1 may acquire a image from other devices.

Further, the external device 1000-1 may transmit the acquired image to the electronic device 1000-2 in operation S2120.

Further, the electronic device 1000-2 performs user authentication in operation S2130. In this case, the image provided by the external device 1000-1 is highly likely to include personal information and therefore the user authentication may be performed for security strengthening. In this case, the user authentication may include various authentication methods, such as ID/password (PW) authentication, fingerprint authentication, and iris authentication.

Further, the electronic device 1000-2 adds audio data to the image in operation S2140. In this case, the electronic device 1000-2 may directly record a volunteer's voice and add it as the audio data, which is only an example. Therefore, the electronic device 1000-2 may add a text input by a volunteer as the audio data by the TTS conversion.

Further, the electronic device 1000-2 transmits the image to which the audio data are added to the external device 1000-1 in operation S2150.

Further, the external device 1000-1 performs the user authentication in operation S2160. This is also a process of performing security strengthening.

Further, the external device 1000-1 plays the image to which the audio data are added in operation S2170.

Further, the external device 1000-1 transmits a confirmation message to the electronic device 1000-2 in operation S2180 and the electronic device 1000-2 deletes a image in response to the confirmation message in operation S2190.

Figure 22:
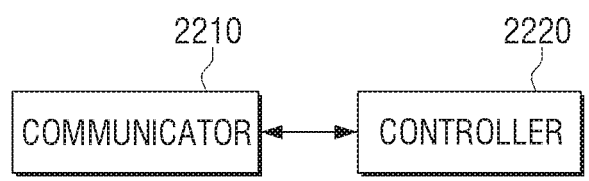
FIG. 22 is a block diagram illustrating a configuration of an electronic device according to an embodiment of the present disclosure.

FIG. 22 is a block diagram illustrating the configuration of the electronic device 1000-2 according to an embodiment of the present disclosure.

Referring to FIG. 22, the electronic device 1000-2 may include a communicator 2210 and a controller 2220.

The communicator 2210 communicates with the external device 1000-1. In this case, the communicator 2210 may receive the image from the external device 1000-1 and transmit the image into which the region guide information is inserted to the external device 1000-1.

The controller 2220 controls the overall operation of the electronic device 1000-2. In particular, the controller 2220 may segment the image received through the communicator 2210 into a plurality of regions and analyze the plurality of segmented regions to generate the region guide information corresponding to the plurality of regions and control the communicator 2210 to transmit the acquired region guide information to the external device 1000-1.

In this case, the controller 2220 may receive all the frames of the image from the external device 1000-1 and select the key frame and segment the selected key frame into the plurality of regions, which is only an example. Therefore, the controller 2220 may receive only the key frame of the image from the external device, segment the received key frame into the plurality of regions and analyze it.

Further, the controller 2220 may recognize the text included in the received image using the OCR or analyze the category corresponding to the image based on the pixel analysis.

Further, the controller 2220 may synchronize the region guide information with the corresponding screen and provide it. In particular, when the playing length of the region guide information is longer than that of the image, the controller 2220 may insert at least one of the copy frame and the interpolation frame into the image as illustrated in FIGS. 12A to 14B.

Further, if the user instruction touching the first region among the received images is input, the controller 2220 may analyze the first region to which the user instruction is input and generate the region guide information corresponding to the first region based on the analyzed results and insert it into the image.

Further, the controller 2220 may control the communicator 2210 to transmit the positions of the corresponding regions along with the acquired region guide information.

According to various embodiments of the present disclosure as described above, an individual suffering from blindness may receive the intuitive information on the image contents through the region guide information.

Meanwhile, the method for controlling an electronic device according to various embodiments of the present disclosure described above may be implemented by a program and be provided to a display apparatus or an input apparatus. Particularly, a problem including a method for controlling the display apparatus may be stored in a non-transitory computer readable medium and provided.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disc (DVD), a hard disk, a Blu-ray disk, a universal serial bus (USB), a memory card, ROM, or the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a communicator configured to communicate with an external device; and
   a processor configured to:
      segment an image received through the communicator into a plurality of regions,
      analyze the plurality of regions to generate region guide information corresponding to the plurality of regions, and
      control the communicator to transmit the region guide information to the external device,
   wherein the region guide information comprises audio data for guiding an information of the plurality of regions, and
   wherein, based on a playing length of an image in a first region among the plurality of regions being shorter than a playing length of first audio data associated with the first region, insert at least one of a copy frame or an interpolation frame into the image in the first region.

2. The electronic device of claim 1, wherein the processor is further configured to:
   receive a key frame of the image from the external device, and
   analyze and segment the received key frame into the plurality of regions.

* * * * *